(12) United States Patent
Ohta et al.

(10) Patent No.: US 11,022,543 B2
(45) Date of Patent: Jun. 1, 2021

(54) MOBILE CHEMICAL ANALYSIS

(71) Applicant: International Business Machines Corporation, Armonk, NY (US)

(72) Inventors: Ricardo Luis Ohta, Sao Paulo (BR); Ademir Ferreira da Silva, Sao Paulo (BR); Andre de Oliveira Botelho, Sao Paolo (BR); Matheus Esteves Ferreira, Rio de Janeiro (BR); Jaione Tirapu Azpiroz, Rio de Janeiro (BR); Michael Engel, Rio de Janeiro (BR); Mathias Steiner, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 395 days.

(21) Appl. No.: 15/941,692

(22) Filed: Mar. 30, 2018

(65) Prior Publication Data

US 2019/0302008 A1    Oct. 3, 2019

(51) Int. Cl.
*G01N 21/25* (2006.01)
*G01N 21/27* (2006.01)

(52) U.S. Cl.
CPC ......... *G01N 21/278* (2013.01); *G01N 21/251* (2013.01); *G01N 2201/0221* (2013.01);
(Continued)

(58) Field of Classification Search
CPC .. G01N 21/251; G01N 21/274; G01N 21/278; G01N 21/78; G01N 2201/0221;
(Continued)

(56) References Cited

U.S. PATENT DOCUMENTS

| 8,628,729 B2 | 1/2014 | Carrilho et al. |
| 9,569,858 B2 | 2/2017 | Babcock et al. |

(Continued)

FOREIGN PATENT DOCUMENTS

| CN | 104586364 A | 5/2015 |
| CN | 106226291 A | 12/2016 |

(Continued)

OTHER PUBLICATIONS

Disclosed Anonymously, "Portable Electronic Device with Chemical Sensor," ip.com, IPCOM000234766D, Feb. 3, 2014, 31 pages.

(Continued)

*Primary Examiner* — John E Breene
*Assistant Examiner* — Jeffrey P Aiello
(74) *Attorney, Agent, or Firm* — Joseph Petrokaitis; Ryan, Mason & Lewis, LLP

(57) ABSTRACT

A target sample to be chemically analyzed is received at a microfluidic device which is part of an analysis card. The microfluidic device includes at least one input layer configured to receive the target sample, at least one intermediary layer, and at least one readout layer configured to present one or more color attributes at one or more readout regions in response to one or more colorimetric reactions to the target sample. An image of the readout layer of the microfluidic device is obtained. A calibration file that corresponds to the analysis card is obtained. The calibration file includes a calibrated model of at least one color attribute based on data from at least one known chemical attribute of at least one standard sample processed by a calibration card. A data processing function is executed on the obtained image by comparing the one or more color attributes at the one or more readout regions to the calibrated model of the at least one color attribute to determine at least one chemical attribute of the target sample.

30 Claims, 19 Drawing Sheets

(52) U.S. Cl.
CPC . *G01N 2201/102* (2013.01); *G01N 2201/126* (2013.01); *G01N 2201/1266* (2013.01); *G01N 2201/13* (2013.01)

(58) Field of Classification Search
CPC ..... G01N 2201/126; G01N 2201/1266; G01N 2201/13
USPC .................. 340/539.12; 422/68.1, 82.05; 436/164–165; 506/2; 600/476; 702/19, 702/22, 25, 27, 30, 85, 188
See application file for complete search history.

(56) References Cited

U.S. PATENT DOCUMENTS

| | | | |
|---|---|---|---|
| 2002/0150502 A1* | 10/2002 | Weigl ................. | B01L 3/50273 422/400 |
| 2005/0013732 A1* | 1/2005 | Battrell ................. | C12Q 1/686 436/17 |
| 2005/0106713 A1* | 5/2005 | Phan ................. | A61B 5/150022 435/287.2 |
| 2007/0031289 A1* | 2/2007 | Cox ................. | B01L 3/502761 422/73 |
| 2007/0095393 A1* | 5/2007 | Zucchelli ............ | F16K 99/0001 137/68.11 |
| 2007/0166196 A1* | 7/2007 | Bardell ............ | G01N 35/00663 422/68.1 |
| 2007/0172388 A1* | 7/2007 | Padmanabhan .... | G01N 15/1459 422/400 |
| 2007/0190525 A1* | 8/2007 | Gu ................... | B01L 3/502776 435/5 |
| 2008/0289692 A1* | 11/2008 | Zucchelli .......... | B01L 3/502738 137/2 |
| 2009/0039000 A1* | 2/2009 | Zucchelli ............ | B01F 15/0233 210/91 |
| 2011/0123398 A1 | 5/2011 | Carrilho et al. | |
| 2014/0296112 A1* | 10/2014 | O'Driscoll ............ | G01J 3/0208 506/39 |
| 2015/0247190 A1 | 9/2015 | Ismagilov et al. | |
| 2017/0154438 A1 | 6/2017 | Kisner et al. | |
| 2017/0184545 A1 | 6/2017 | Azpiroz et al. | |
| 2017/0247743 A1 | 8/2017 | Leung et al. | |
| 2018/0059015 A1* | 3/2018 | Li ........................ | G01N 33/146 |
| 2018/0229234 A1 | 8/2018 | Ohta et al. | |

FOREIGN PATENT DOCUMENTS

| | | |
|---|---|---|
| CN | 106290941 A | 1/2017 |
| CN | 106991679 A | 7/2017 |
| WO | 2017039473 A1 | 3/2017 |

OTHER PUBLICATIONS

Disclosed Anonymously, "Method and System for Identifying a Fluid Sample," ip.com, IPCOM000227946D, May 30, 2013, 36 pages.
D.M. Friedrich et al., "Miniature Near-Infrared Spectrometer for Point-of-Use Chemical Analysis," Proceedings of SPIE, Photonic Instrumentation Engineering, Mar. 8, 2014, 11 pages, vol. 8992.
T.-T. Tsai et al., "Paper-Based Tuberculosis Diagnostic Devices with Colorimetric Gold Nanoparticles," National Institute for Materials Science, Science and Technology of Advanced Materials, 7 pages, vol. 14, No. 4.
A.W. Martinez et al., "Diagnostics for the Developing World: Microfluidic Paper-Based Analytical Devices," Analytical Chemistry, Jan. 1, 2010, pp. 3-10, vol. 82, No. 1.
G.G. Lewis et al., "High Throughput Method for Prototyping Three-Dimensional, Paper-Based Microfluidic Devices," Lab Chip, 2012, pp. 2630-2633, vol. 12.
L. Shen et al., "Point-of-Care Colometric Detection with a Smartphone," Lab Chip, 2012, pp. 4240-4243, vol. 12.
Emanuel Carrilho, "Toner and Paper-Based Fabrication Techniques for Microfluidic Applications," Pittcon Conference & Expo, Mar. 17-21, 2013, 49 pages.
K. Pardee et al., "Rapid, Low-Cost Detection of Zika Virus Using Programmable Biomolecular Components," Cell, May 19, 2016, pp. 1255-1266, vol. 165, No. 5.
M. Wang et al., "Recent Advances in the Design of Polymeric Microneedles for Transdermal Drug Delivery and Biosensing," Lab Chip, Apr. 11, 2017, pp. 1373-1387, vol. 17, No. 8.
A.W. Martinez et al., "Simple Telemedicine for Developing Regions: Camera Phones and Paper-Based Microfluidic Devices for Real-Time, Off-Site Diagnosis," Analytical Chemistry, May 15, 2008, pp. 3699-3707, vol. 80, No. 10.
N. Lopez-Ruiz et al., "Smartphone-Based Simultaneous pH and Nitrite Colorimetric Determination for Paper Microfluidic Devices," Analytical Chemistry, Aug. 2014, pp. 9554-9562, vol. 86.
W. Karlos et al., "Toner and Paper-Based Fabrication Techniques for Microfluidic Applications," Electrophoresis Review, Jul. 23, 2010, pp. 2487-2498, vol. 31.
E. Carrilho et al., "Understanding Wax Printing: A Simple Micropatterning Process for Paper-Based Microfluidics," Analytical Chemistry, Aug. 15, 2009, pp. 7091-7095, vol. 81, No. 16.
C.D. Chin et al., "Commercialization of Microfluidic Point-of-Care Diagnostic Devices," Lab Chip, Jun. 21, 2012, pp. 2118-2134, vol. 12, No. 12.
N. Godino et al., "Fabricating Electrodes for Amperometric Detection in Hybrid Paper/Polymer Lab-on-a-Chip Devices," Lab Chip, Sep. 21, 2012, pp. 3281-3284, vol. 12, No. 18.
X. Mao et al., "Microfluidic Diagnostics for the Developing World," Lab Chip, Apr. 21, 2012, pp. 1412-1416, vol. 12, No. 8.
A.F. Chrimes et al., "Microfluidics and Raman Microscopy: Current Applications and Future Challenges," Chemical Society Reviews, Jul. 7, 2013, pp. 5880-5906, vol. 42, No. 13.
S. Jahanshahi-Anbuhi et al., "Paper-Based Microfluidics with an Erodible Polymeric Bridge Giving Controlled Release and Timed Flow Shutoff," Lab Chip, 2014, pp. 229-236, vol. 14.
S. Li et al., "Microfluidic Opportunities in the Field of Nutrition," Lab Chip, Oct. 21, 2013, pp. 3993-4003, vol. 13, No. 20.
M.R. Hartman et al., "Point-of-Care Nucleic Acid Detection Using Nanotechnology," Nanoscale, Nov. 7, 2013, pp. 10141-10154, vol. 5, No. 21.
Q.-L. Li et al., "Surface-Enhanced Raman Scattering Microfluidic Sensor," RSC Advances, 2013, pp. 13015-13026, 3, vol. 3, No. 32.
C.F. Fronczek et al., "Paper Microfluidic Extraction and Direct Smartphone-Based Identification of Pathogenic Nucleic Acids from Field and Clinical Samples," RSC Advances, Feb. 2014, pp. 1103-11110, vol. 4.
E. Elizalde et al., "Rational Design of Capillary-Driven Flows for Paper-Based Microfluidics," Lab Chip, 2015, pp. 2173-2180, vol. 15.
P.K. Chaudhuri et al, "Microfluidics for Research and Applications in Oncology," The Analyst, May 26, 2015, pp. 504-524, vol. 141, No. 2.
X. Fang et al., "Rapid Nucleic Acid Detection of Zaire Ebolavirus on Paper Fluidics," RSC Advances, 2015, pp. 64614-64616, vol. 5.
Z. Li et al., "Fabrication of Paper Micro-Devices with Wax Jetting," RSC Advances, Feb. 3, 2016, pp. 17921-17928, vol. 6.
A.M. López-Marzo et al., "Paper-Based Sensors and Assays: a Success of the Engineering Design and the Convergence of Knowledge Areas," Lab Chip, 2016, pp. 3150-3176, vol. 16.
J. Wang et al., "Random Design of Microfluidics," Lab Chip, Oct. 18, 2016, pp. 4212-4219, vol. 16, No. 21.
J.C. Yeo et al., "Emergence of Microfluidic Wearable Technologies," Lab Chip, Oct. 18, 2016, pp. 4082-4090, vol. 16, No. 21.
E. Fu et al., "Progress in the Development and Integration of Fluid Flow Control Tools in Paper Microfluidics," Lab Chip, Jan. 25, 2017, pp. 614-628, vol. 17.
I.J. Jahn et al., "Surface-Enhanced Raman Spectroscopy and Microfluidic Platforms: Challenges, Solutions and Potential Applications," Analyst, Mar. 2017, pp. 1022-1047, vol. 142, No. 7.
D. Moschou et al., "The Lab-on-PCB Approach: Tackling the µTAS Commercial Upscaling Bottleneck," Lab Chip, Mar. 3, 2017, pp. 1388-1405, vol. 17.

(56) References Cited

OTHER PUBLICATIONS

H. Yao et al., "Identification of Genetic Variation Among Dengue Virus DEN-4 Isolates with Heteroduplex Analysis," Dengue Bulletin, Dec. 26, 2002, pp. 118-124, vol. 26.

* cited by examiner

700

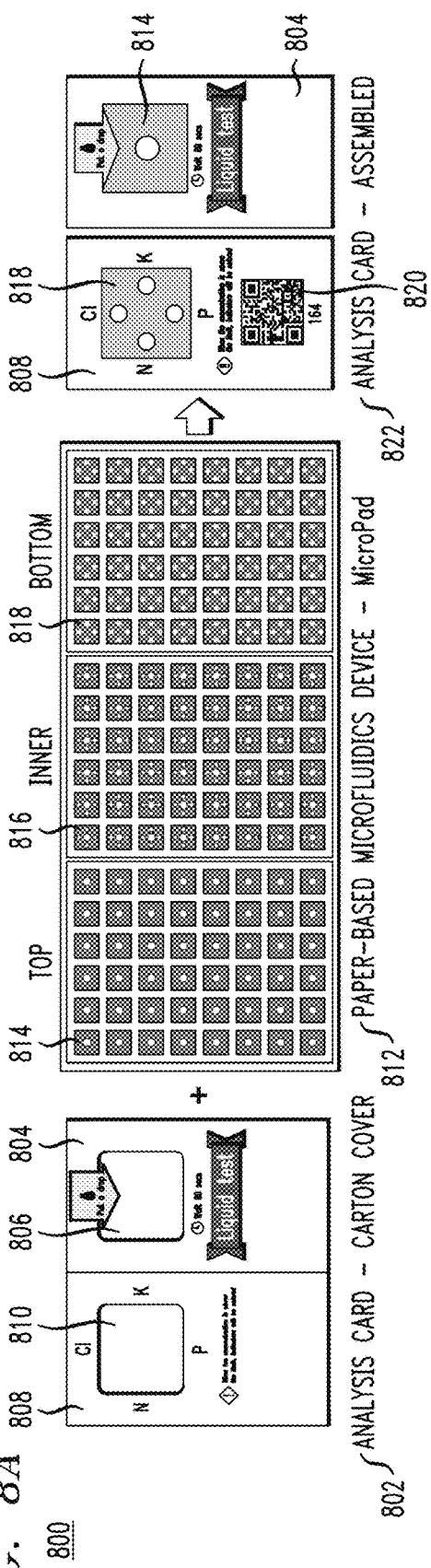
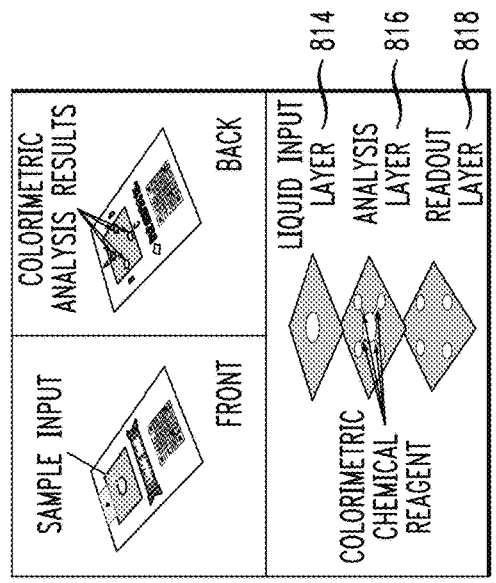

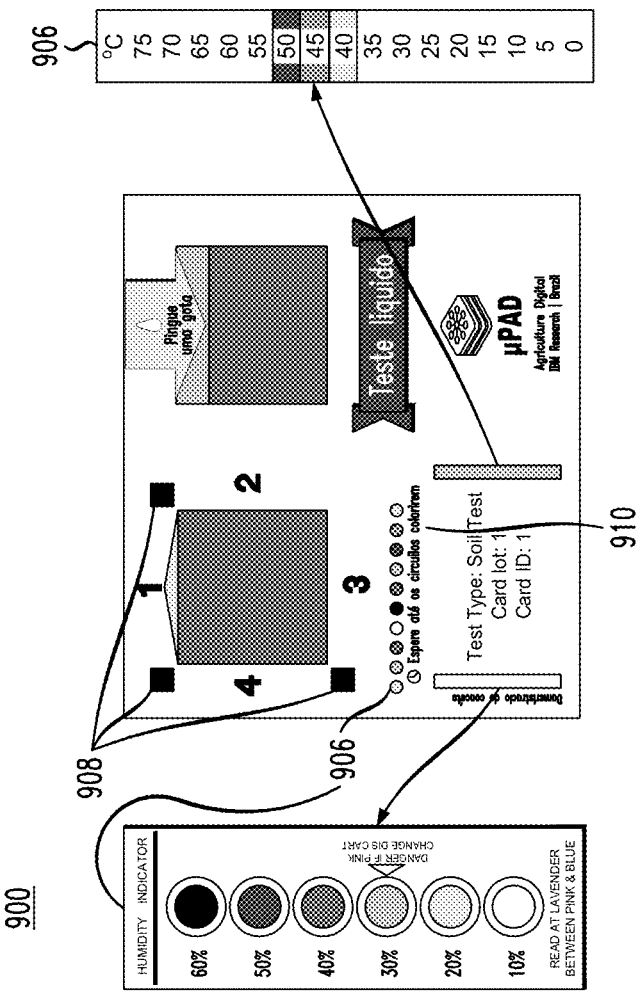
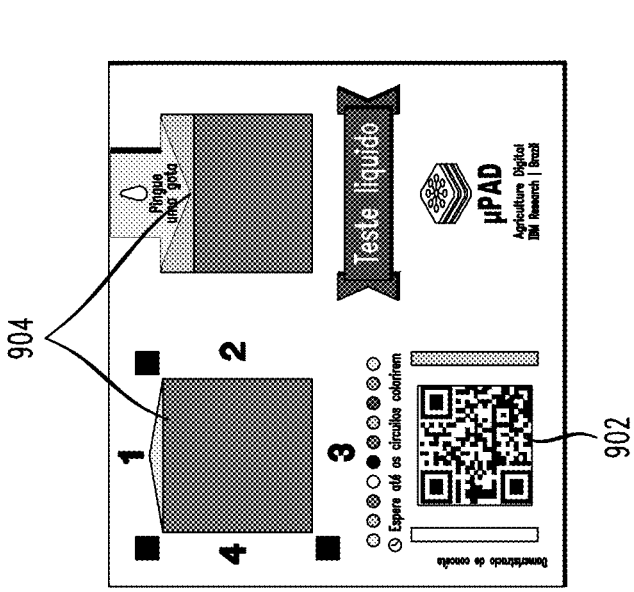
FIG. 9

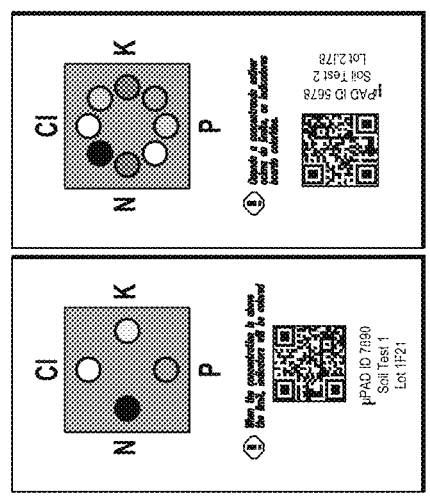
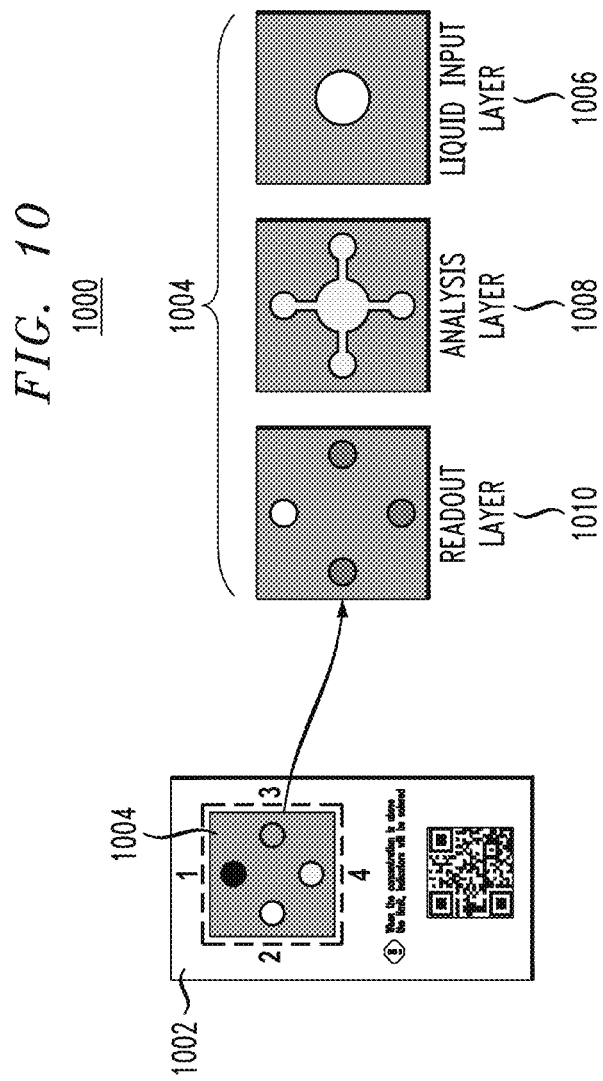
FIG. 10

FIG. 11
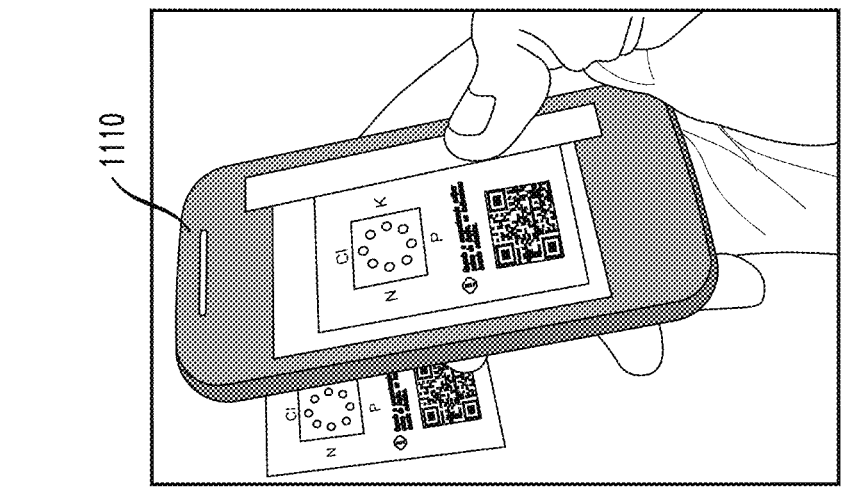
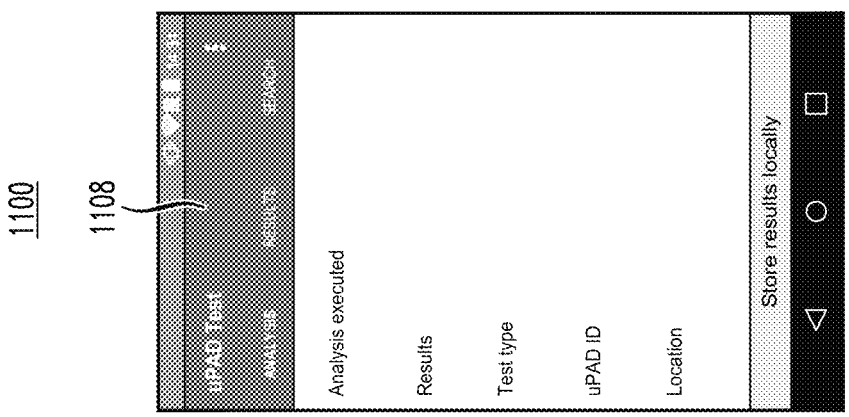
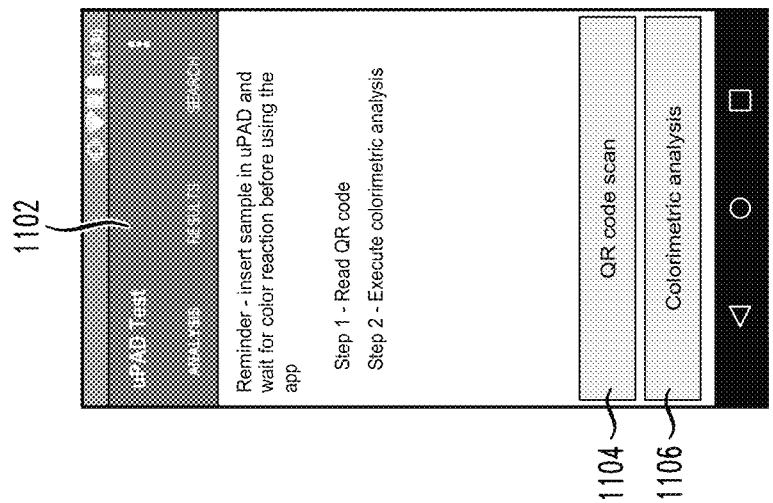

1200

MOBILE CHEMICAL ANALYSIS

BACKGROUND

Chemical analysis of fluid or solid samples is an important task for many applications including, but not limited to, environmental, military, medical diagnosis and health monitoring, as well as applications in the fields of agriculture, counterfeiting/adulteration detection, farming and animal care. Performing the task in the field, i.e., outside a controlled laboratory environment, provides substantial advantages in terms of cost, execution and result availability time. Existing solutions for performing chemical analysis in the field have been limited to very few chemical tests and lacked the ability to effectively track or otherwise manage the devices used to perform the chemical analyses.

SUMMARY

Embodiments provide techniques for performing enhanced mobile chemical analysis.

In an illustrative embodiment, a method comprises the following steps. A target sample to be chemically analyzed is received by a microfluidic device which is part of an analysis card. The microfluidic device comprises at least one input layer configured to receive the target sample, at least one intermediary layer, and at least one readout layer configured to present one or more color attributes at one or more readout regions in response to one or more colorimetric reactions to the target sample. An image of the readout layer of the microfluidic device is obtained. A calibration file that corresponds to the analysis card is obtained. The calibration file comprises at least one calibrated model of one or more color attributes based on data from at least one known chemical attribute of at least one standard sample processed by a calibration card. At least one data processing function is executed on the obtained image. The data processing function comprises comparing the one or more color attributes at the one or more readout regions in the obtained image of the readout layer to the one or more calibrated models of one or more color attributes of the obtained calibration file to determine at least one chemical attribute of the target sample.

In another illustrative embodiment, a system comprises one or more processing devices, wherein each processing device comprises a memory and a processor operatively coupled to the memory. The one or more processing devices are configured to: obtain an image of a readout layer of a microfluidic device, wherein the microfluidic device is part of an analysis card and comprises at least one input layer configured to receive a target sample to be chemically analyzed, at least one intermediary layer, and at least one readout layer configured to present one or more color attributes at one or more readout regions in response to one or more colorimetric reactions to the target sample. The one or more processing devices are further configured to obtain a calibration file that corresponds to the analysis card, wherein the calibration file comprises at least one calibrated model of one or more color attributes based on data from at least one known chemical attribute of at least one standard sample processed by a calibration card. The one or more processing devices are further configured to execute at least one data processing function on the obtained image, wherein the data processing function comprises comparing the one or more color attributes at the one or more readout regions in the obtained image of the readout layer to the one or more calibrated models of one or more color attributes of the obtained calibration file to determine at least one chemical attribute of the target sample.

In yet another illustrative embodiment, an apparatus comprises a microfluidic device and a code. The microfluidic device comprises: one or more input layers configured to receive a target sample to be chemically analyzed; one or more readout layers configured to present one or more color attributes at one or more readout regions in response to one or more colorimetric reactions to the target sample; and one or more analysis layers operatively disposed between the input layer and the readout layer, and configured to provide one or more colorimetric analyses on the target sample received at the input layer such that the one or more color attributes are presented at the readout layer in response to the one or more colorimetric reactions. The code is configured to uniquely identify a calibration file for retrieval, number of colorimetric analysis, etc. The calibration file corresponds to one or more capabilities of the microfluidic device and comprises at least one calibrated model of one or more color attributes based on data from at least one known chemical attribute of at least one standard sample. The calibration file executes at least one data processing function that comprises comparing the one or more color attributes at the one or more readout regions of the readout layer to the calibrated model of one or more color attributes of the obtained calibration file to determine at least one chemical attribute of the target sample.

Advantageously, illustrative embodiments enable performance of chemical analysis in the field for essentially an unlimited variety of chemical tests (e.g., limited only by the number of readout regions with their corresponding calibrated model available for comparison or availability of suitable colorimetric reagents) and provide the ability to effectively manage devices used to perform the chemical analyses (e.g., individually track analysis cards from different manufacturing lots and/or for different chemical analysis tests).

These and other exemplary embodiments of the invention will be described in or become apparent from the following detailed description of exemplary embodiments, which is to be read in connection with the accompanying drawings.

BRIEF DESCRIPTION OF THE DRAWINGS

FIGS. 8A and 8B illustrate components of a chemical analysis card, according to an illustrative embodiment.

FIG. 9 illustrates further details of a chemical analysis card, according to an illustrative embodiment.

FIG. 10 illustrates additional details and variations of a chemical analysis card, according to an illustrative embodiment.

FIG. 11 illustrates a mobile application portion of a mobile chemical analysis methodology, according to an illustrative embodiment.

DETAILED DESCRIPTION

Illustrative embodiments will be described below for performing enhanced mobile chemical analysis. While certain types of chemical tests and types of microfluidic devices will be described in certain illustrative embodiments, it is to be understood that other embodiments are not limited to the illustrative types mentioned. Further, while certain types of computing platforms and types of processing devices will be described in certain illustrative embodiments, it is to be understood that other embodiments are not limited to the types mentioned. Also, while the mobile chemical analysis techniques described herein are particularly advantageous for use in the field, the techniques can be used in other environments.

In one or more illustrative embodiments, a mobile chemical analysis system is provided that executes chemical analysis (e.g., in the field). The mobile chemical analysis system, as will be further explained below, in the context of FIGS. 1-19, includes one or more paper-based microfluidic chips where colorimetric analysis is executed, a mobile application installed in a mobile device (e.g., smartphone), and a cloud computing service instance.

Advantageously, colorimetric analysis on paper-based microfluidics enables low-cost testing, high design flexibility and easy large-scale fabrication, which combines with easy implementation of various tests on the same analysis card. Further, quick and low-cost analysis executed in-loco, combined with cloud computing technology, allows frequent data gathering in remote locations, while analytics/artificial intelligence techniques allow generation of important insights for more effective usage of resources. Still further, a smartphone is a powerful platform to be used in field tests due to increased availability in connectivity, processing power and ubiquity.

Illustrative embodiments may be employed in accordance with a wide variety of use cases. By way of example only, some use cases include:

Environmental: water potability tests, presence of hazardous bacteria (e.g.: E. Coli, Faecal Coliform, etc.) and chemical compositions (e.g.: pH, Mg, Ca, Fe, etc.);

Precision Agriculture: fertilizer usage optimization, minimizing the environmental impact while increasing the crop productivity; and Healthcare: provide quicker results in-loco, allowing earlier treatment, with better recovery for the patient.

Figure 1:
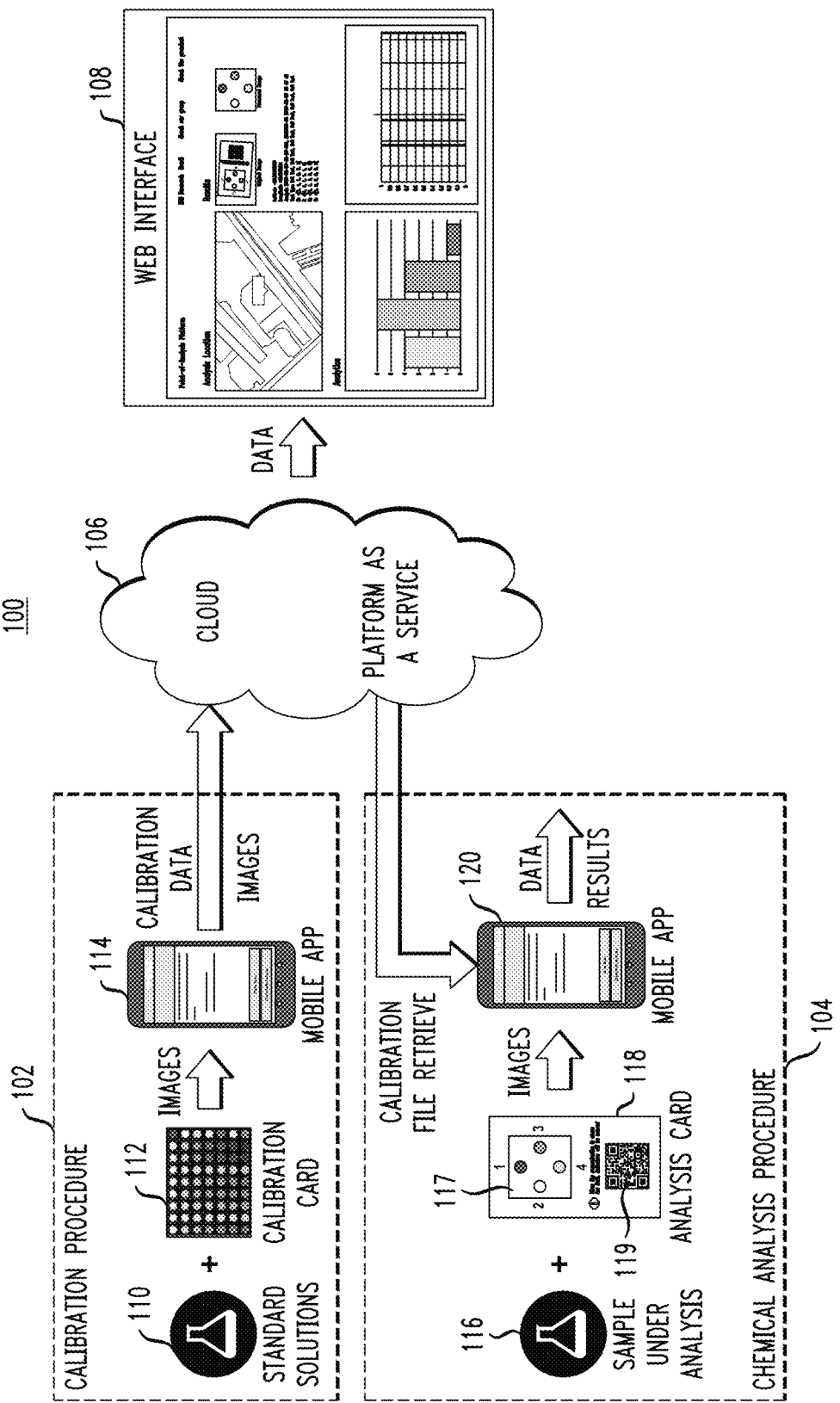
FIG. 1 illustrates a mobile chemical analysis system, according to an illustrative embodiment.

FIG. 1 illustrates an overview of a system 100 configured to perform mobile chemical analysis on a target sample, according to an illustrative embodiment. As shown, the system 100 comprises calibration procedure 102, chemical analysis procedure 104, cloud computing environment 106, and a web interface 108. Calibration procedure 102 and the chemical analysis procedure 104 are operatively coupled to the cloud computing environment 106 via one or more communication networks such as, but not limited to, the Internet. In such an embodiment, web interface 108 is operatively coupled to the cloud computing environment 106 via one or more of the same communication networks. Alternative communication network connectivity, other than that shown in FIG. 1, may be implemented in alternative embodiments. Further, the one or more communication networks may comprise one or more private networks, such as an Intranet, and/or one or more wireless communication networks.

As further shown, the calibration procedure 102 comprises applying one or more standard solutions 110 to a calibration card 112. The calibration card 112 presents one or more color attributes at one or more readout regions of the calibration card 112 in response to a colorimetric reaction to the one or more standard solutions 110. The one or more color attributes can be one or more actual colors (or grayscale shades), in one embodiment, but alternatively may be one or more spatial distributions of one or more colors analyzed (e.g., where the calibration includes analyzing the shape of the color distribution in the output spot). The calibration procedure 102 further comprises obtaining an image of the calibration card 112 using a mobile device 114, such as a smartphone or tablet device in one or more illustrative embodiments. Mobile device 114 is configured to capture one or more images of the calibration card 112 (e.g., using a camera or other image capture device that is part of or attached to the mobile device 114). Mobile device 114 is also configured to execute a mobile application such that the image data obtained from the calibration card 112 is converted into calibration data, and after converting the image, the mobile device 114 sends the calibration data to the cloud computing environment 106, where calibration techniques are applied in order to generate a calibration file. In another illustrative embodiment, mobile device 114 sends the captured image data of the calibration card 112 to the cloud computing environment 106 such that the cloud computing environment 106 converts the image data into calibration data and applies calibration techniques in order to generate a calibration file. In yet another illustrative embodiment, mobile device 114 is configured to convert the captured image data into calibration data and to apply calibration techniques in order to generate a calibration file, and then send the calibration file to the cloud computing environment 106. In either case, such calibration data and/or calibration file is stored in the cloud computing environment 106 for later use and retrieval, as will be further explained below. Accordingly, in one or more illustrative embodiments, the calibration file may comprise one or more calibrated models that represent one or more color attributes based on data from at least one known chemical attribute of at least one standard sample processed by the calibration card 112.

As further shown in FIG. 1, chemical analysis procedure 104 comprises applying a target sample 116 to an analysis card 118. The analysis card 118 comprises a microfluidic device 117 and code 119 that will be further explained below in the context of other figures. Analysis card 118 is configured to present one or more color attributes at one or more readout regions (of microfluidic device 117) in response to one or more colorimetric reactions to the target sample 116. The chemical analysis procedure 104 further comprises obtaining an image of the analysis card 118 using mobile device 120. Mobile device 120 may be a smartphone or tablet device in one or more illustrative embodiments. Note that mobile device 120 may be the same mobile device as mobile device 114 (e.g., when the same mobile device is used for the calibration procedure 102 and the chemical analysis procedure 104) but can also be a different device. Mobile device 120 is configured to capture an image of the analysis card 118. Mobile device 120 is further configured to execute a mobile application such that the image data obtained from the analysis card 118 is converted into color attribute data and compared to the calibrated data obtained from the calibration file (calibrated model) stored in cloud computing environment 106. As will be explained in further detail below, the code 119 is used to obtain the appropriate calibration file from the cloud computing environment 106. The calibration file can also be locally stored on the mobile device 120. The chemical analysis procedure 104 may further comprise a data processing function comparing the one or more color attributes at the one or more readout regions in the obtained image of the readout layer of the analysis card 118 to the calibrated model of one or more color attributes of the obtained calibration file to determine at least one chemical attribute of the target sample. The chemical analysis procedure 104 may further comprise the mobile device 120 sending the analysis results to the cloud computing environment 106 such that the cloud computing environment 106 stores such data. In an alternative embodiment, the data processing function is performed by the cloud computing environment 106. The cloud computing environment 106 can store the converted color attribute data for later use.

Cloud computing environment 106 may be configured to receive calibration data from mobile device 114, send calibration files to mobile device 120, receive captured images, color attribute data and/or analysis results from mobile device 120, and send data to a web interface 108. In one embodiment, cloud computing environment 106 implements a Platform-as-a-Service (PaaS) model. Illustrative embodiments of cloud computing environment 106 are further described below in the context of FIGS. 15-19.

Web interface 108 may be configured to receive data from the cloud computing environment 106. Web interface 108 may be configured to visualize the received data and allow a user to sort and classify the data. Web interface 108 also provides data access control and geographical distribution visualization of the executed analysis.

Figure 2:
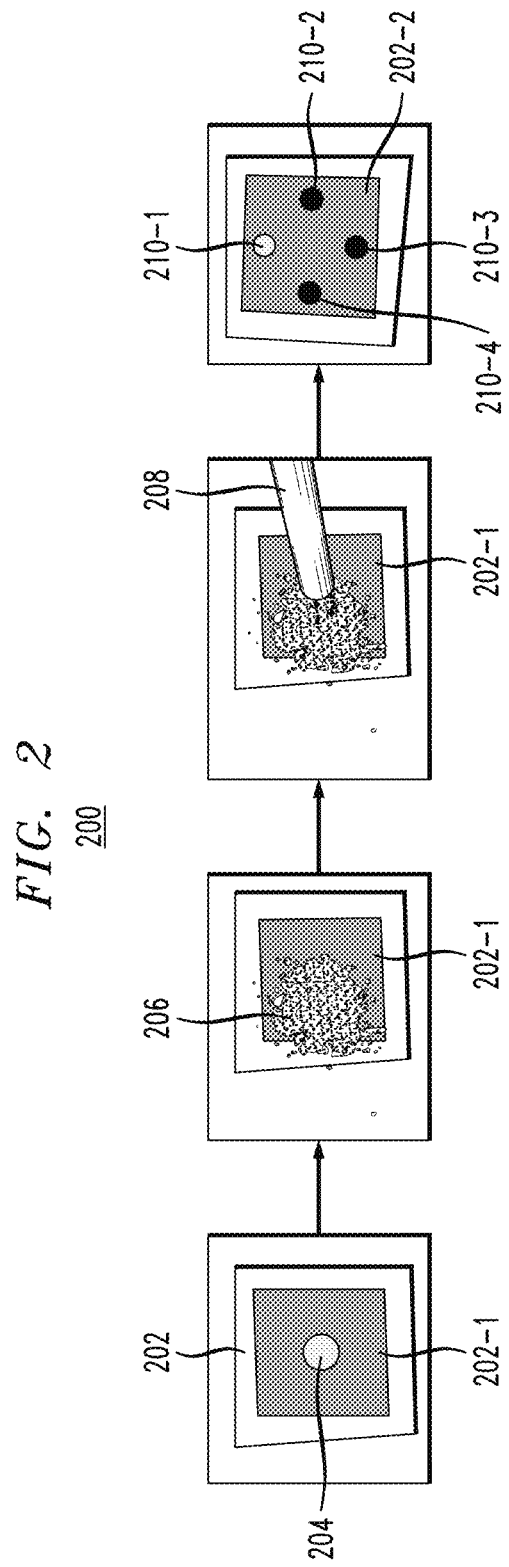
FIG. 2 illustrates an exemplary use case for a mobile chemical analysis system, according to an illustrative embodiment.

FIG. 2 illustrates an exemplary use case for mobile chemical analysis system 100, wherein the pH-level of a soil sample is analyzed. FIG. 2. depicts microfluidic device 202 (which is one example of microfluidic device 117 on analysis card 118 in FIG. 1) comprising input layer 202-1 and readout layer 202-2. The microfluidic device may also comprise one or more intermediary layers (not shown in FIG. 2) that provide chemical analysis that produce visible results on the readout layer, which will be further described in detail below. Input layer 202-1 comprises input section 204 configured to receive a sample 206. In this case, the sample 206 is soil. After applying sample 206 to input section 204 of input layer 202-1, fluid (e.g., water, buffer solution, etc.) can be applied to sample 206 via, for example, pipette 208 such that capillary action present in the microfluidics device 202 permits substances of the sample 206 to be transported through the channels of the microfluidics device 202 and present one or more colors at one or more readout regions 210 of the readout layer 202-2 in response to a colorimetric reaction to the sample 206 with the reagents embedded in the device's intermediary layer. Such colors at the readout regions 210 can provide information, such as, in this use case, the pH-level of the sample 206. FIG. 2 depicts four readout regions 210-1, 210-2, 210-3, and 210-4 on the readout layer 202-2 of the microfluidics device 202; however, this is for exemplary purposes only and the readout layer 202-2 can comprise more or less readout regions 210 corresponding to one or more colorimetric chemical analysis. In one embodiment, the microfluidic device includes the fluid (e.g., water, buffer solution, etc.) such that, when a sample is applied to the input section of the input layer, the fluid is mixed with the sample, thereby permitting the substances of the sample to be transported through the channels of the device and present one or more colors at one or more readout regions of the readout layer in response to a colorimetric reaction to the sample with the reagents embedded in the device's intermediary layer. In such an embodiment, a region on the device where such fluid is located can be pressed, thereby initiating the transportation of the substances of the sample.

Figure 3:
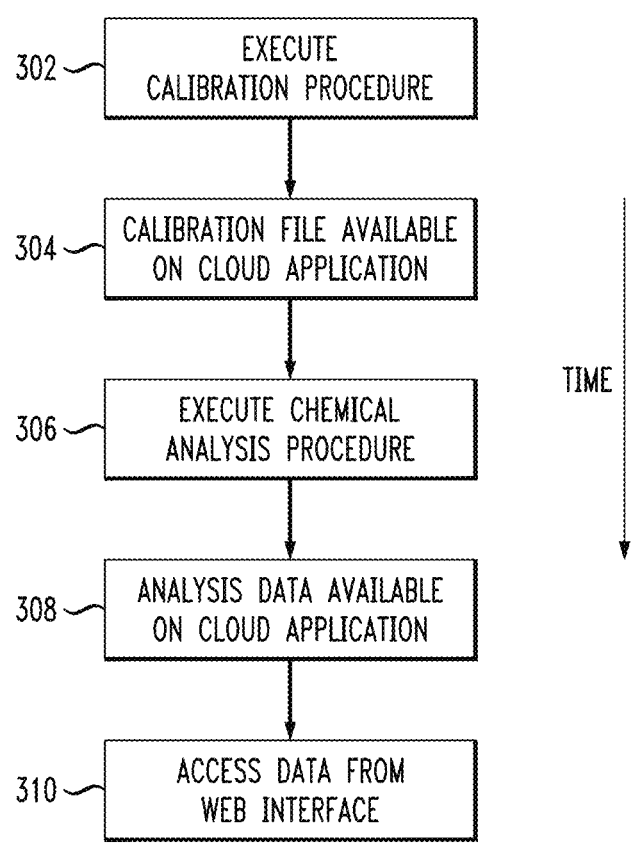
FIG. 3 illustrates a mobile chemical analysis methodology, according to an illustrative embodiment.

FIG. 3 illustrates a methodology 300 for mobile chemical analysis using system 100 (FIG. 1), according to an illustrative embodiment. It is to be appreciated that the mobile chemical analysis may rely on a particular manufacturing lot of a particular analysis card (e.g., 118 of FIG. 1) used to perform the methodology. Accordingly, a calibration procedure (e.g., 102 of FIG. 1) may need to be executed for each manufacturing lot of the analysis cards because of potential variations in the manufacturing processes of the analysis cards or because new colorimetric tests were created. Therefore, it may be necessary to execute a calibration procedure before any target sample analysis (e.g., 104 of FIG. 1) in the field. However, if the calibration procedure has already been executed for a particular manufacturing lot, then a calibration file may exist for that particular manufacturing lot (e.g., stored in and retrievable from cloud computing environment 106 of FIG. 1). Methodology 300 refers to the entire mobile chemical analysis system and operation where a calibration procedure needs to be performed prior to target sample analysis.

At step 302, a calibration procedure is executed (e.g., 102 of FIG. 1). As described above in the context of FIG. 1, calibration data created during this step can be stored locally on mobile device 114 and/or stored in cloud computing environment 106. Further illustrative details of the calibration procedure are further described below.

At step 304, via mobile device 114, a calibration file created during the execution of the calibration procedure in step 302 is made available to a cloud application such that the cloud application stores the calibration file. The cloud application is resident in the cloud computing environment 106. In one embodiment, the mobile device 114 sends the calibration data to the cloud application via one or more communication networks (wireless and/or wired communication networks), where calibration techniques are applied to the calibration data in order to generate a calibration file. In another embodiment, the mobile device 114 is configured to apply calibration techniques to the calibration data in order to generate a calibration file, and to send the calibration file to the cloud application in the cloud computing environment 106 via one or more communication networks. The calibration file may comprise one or more calibrated models of one or more color attributes from at least one known chemical attribute of a standard solutions processed by the calibration card 112.

At step 306, a chemical analysis procedure is executed (e.g., 104 of FIG. 1). In one embodiment, the chemical analysis procedure utilizes the calibration file stored in the cloud application in step 304 to compare analysis data created during the execution of the chemical analysis procedure to one or more calibrated models contained in the calibration file, producing as a result a set of analysis data. In another embodiment, the chemical analysis procedure utilizes the calibration file stored locally on mobile device 114 to compare analysis data created during the execution of the chemical analysis procedure to one or more calibrated models in the calibration file, resulting in a set of analysis data. It is also possible to store locally a copy of the entire calibration data stored in the cloud application, using it during the execution of the chemical analysis procedure. This is especially important for field test locations where a communication network is not available.

At step 308, via mobile device 114, analysis data created during the execution of the chemical analysis procedure in step 306 is made available on the cloud application such that the cloud application stores the analysis data. In one embodiment, mobile device 114 sends the analysis data to the cloud application via one or more communication networks (wireless and/or wired communication networks). Although not explicitly in FIG. 3, it is also possible to store locally the analysis data, when there is no communication network available. The analysis data is sent to the cloud application when a communication network is present.

At step 310, the analysis data is accessed via a web interface (e.g., 108 of FIG. 1). The web interface can, for example, visualize the analysis data of one or more chemical analysis procedures and allow a user to interact with the data, such as, for example, to sort and classify the data as explained above.

Figure 4:
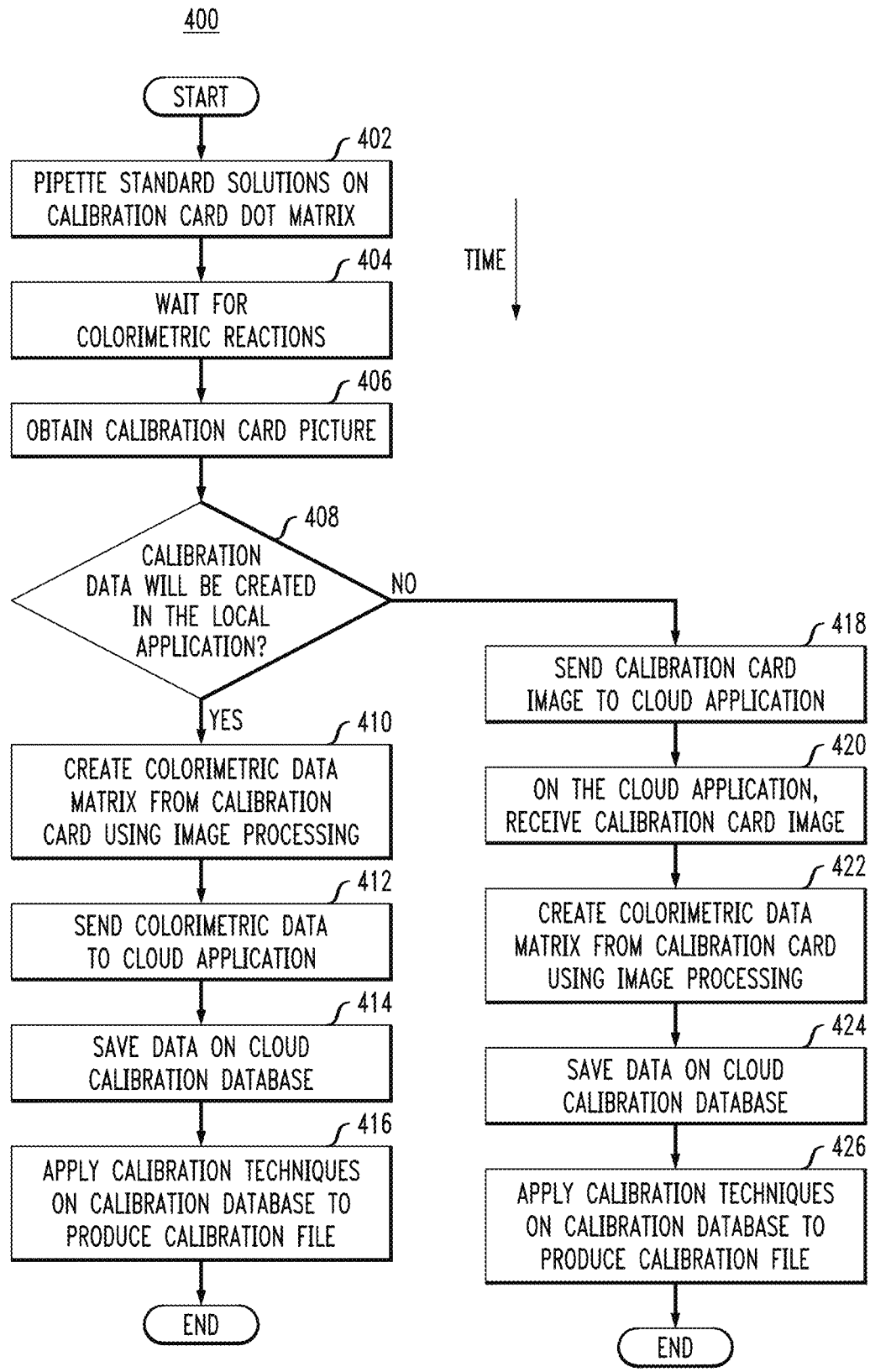
FIG. 4 illustrates a calibration procedure, according to an illustrative embodiment.

Illustrative details of the calibration procedure 302 (FIG. 3) will now be described in the context of FIG. 4. More particularly, FIG. 4 illustrates a calibration procedure 400, which is part of the mobile chemical analysis methodology.

At step 402, one or more standard solutions are applied to a calibration card. Referring back to FIG. 1, the one or more standard solutions are standard solutions 110 and the calibration card is calibration card 112. The one or more standard solutions can be applied to the calibration card via, for example, a pipette, as discussed above in the context of FIG. 2. The standard solutions comprise chemical solutions with precise known chemical element concentrations (i.e., one example of a chemical attribute) of target chemical substances, such as, for example, specific concentrations of nitrate, calcium, etc. or a chemical parameter, such as, for example, pH. Some illustrative embodiments may require several different standard solutions (each with different levels of concentrations of the standard solutions) to create a more precise calibration, thereby allowing the chemical analysis procedure to interpolate an unknown concentration sample more precisely.

At step 404, one or more readout regions of the calibration card present one or more color attributes (e.g., colors and/or color distribution histograms or geometrical properties of the color distribution) in response to a colorimetric reaction to the one or more standard solutions. The one or more color attributes correlate to at least one chemical attribute associated with the one or more standard solutions, such as, for example, the chemical element concentration of the one or more standard solutions. The calibration card can provide for colorimetric analysis because a given readout region of the calibration card contains a suitable chemical reagent to present one or more color attributes in response to the application of the one or more standard solutions. The colorimetric reactions can occur, for example, instantly or take a few minutes, and the reaction time depends on the type of colorimetric analysis performed on the calibration card.

At step 406, an image (or multiple images) of the calibration card is obtained. The image can be obtained by an electronic device. Referring back to FIG. 1, the electronic device can be mobile device 114.

At step 408, it is determined if the calibration data will be created in an application executing on mobile device 114. In one embodiment, the application asks a user if it will be utilizing the application to create the calibration data, where the user responds "Yes" or "No" through the input/output features of the mobile device.

If the calibration data will be created in the application executing on the mobile device 114, at step 410, the mobile device will execute at least one image processing function (more generally, at least one data processing function) on the obtained image from step 406 to convert the image to colorimetric calibration data corresponding to the color attributes present on each readout region of the calibration card. At step 412, the converted colorimetric calibration data is sent to a cloud application and, in step 414, stored on a cloud calibration database containing colorimetric calibration data received from multiple mobile devices or calibration cards, and located in a cloud computing environment 106. At step 416, calibration techniques are applied to the colorimetric calibration data stored on the calibration database to produce a calibration file comprising one or more calibrated models of one or more color attributes, and stored in the cloud environment 106 for retrieval during chemical analysis of the target sample.

If the calibration data will not be created in the application executing on mobile device 114, at step 418, the mobile device will send the image of the calibration card to a cloud application and, at step 420, the cloud application receives the calibration card image. At step 422, the cloud application executes at least one image processing function (more generally, at least one data processing function) on the obtained image from step 406 to convert the image to colorimetric calibration data corresponding to the color attributes present on each readout region of the calibration card. The converted colorimetric calibration data is, at step 424, stored by the cloud application in a cloud calibration database. At step 426, calibration techniques are applied to the colorimetric calibration data stored on the calibration database to produce a calibration file, as described above.

In one illustrative embodiment of this invention, calibration procedure 400 is executed only once for each given manufacturing lot of analysis cards.

Figure 5:
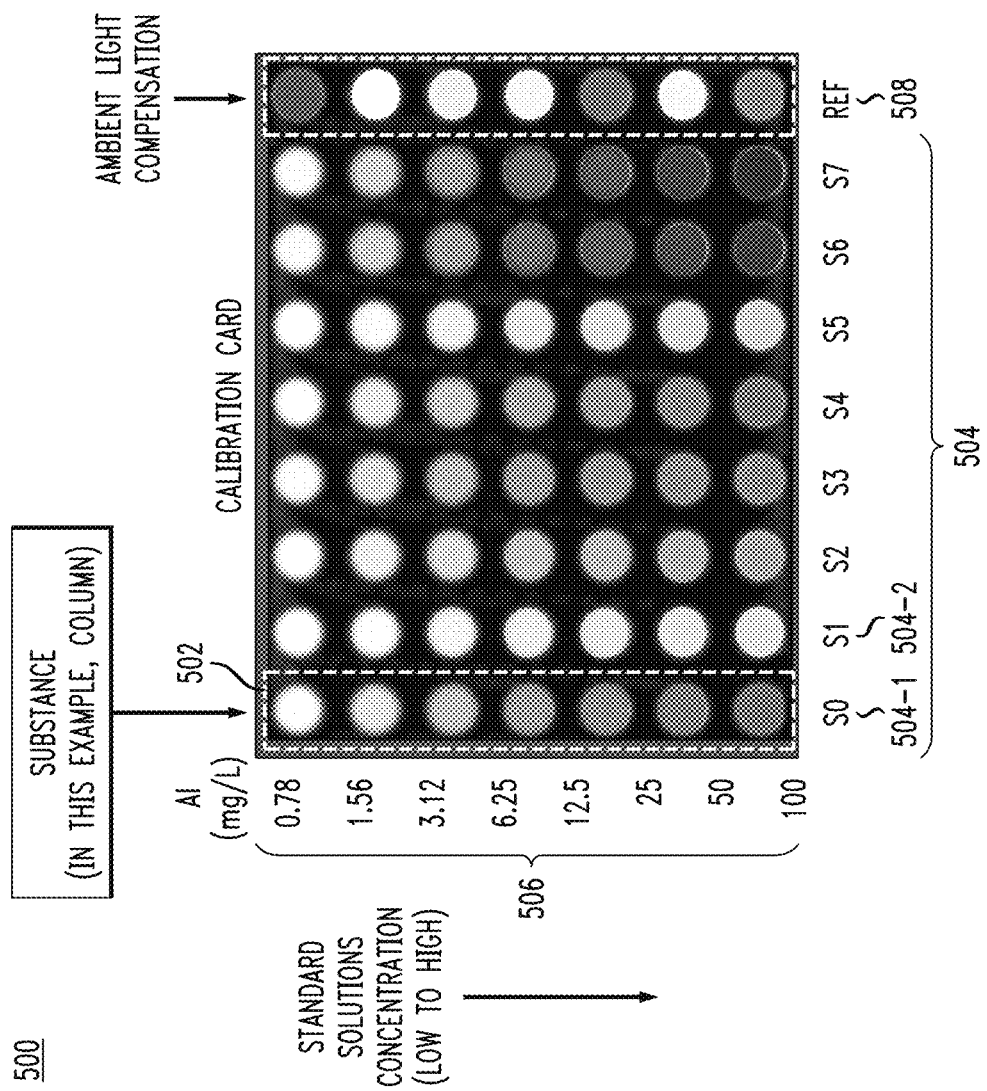
FIG. 5 illustrates a calibration card, according to an illustrative embodiment.

FIG. 5 illustrates details of a calibration card 500 used during a calibration procedure (e.g., 400 of FIG. 4). The calibration card comprises a microfluidic device with at least one input layer configured to receive the standard sample to be chemically analyzed, at least one readout layer configured to present one or more colors at one or more readout regions in response to one or more colorimetric reactions to the standard sample, and one or more intermediary analysis layer operatively disposed between the input layer and the readout layer. The intermediary analysis layers are configured to provide colorimetric analysis on the standard sample received at the input layer such that the one or more colors are presented at the readout layer in response to one or more the colorimetric reactions. Simplified versions of the calibration card can also be used, which could be even a single layer, where the standard sample to be chemically analyzed will be received and where the one or more colorimetric reactions will also occur.

Calibration card 500 comprises one or more readout regions 502. The calibration card 500 can be configured as a circle matrix such that each readout region 502 is a circle in a matrix (row and column) structure as shown in FIG. 5. However, the circle matrix configuration is solely exemplary and the readout regions 502 can be a different shape, with different readout numbers, in alternative embodiments. In FIG. 5, the calibration card 500 comprises seven rows and nine columns, but this configuration is also for exemplary purposes only. A calibration card may comprise any number of rows and columns. It is also possible to use the same configuration of the microfluidics device 117 of the analysis card 118 of FIG. 1 as a calibration card.

Each readout region 502 is pre-treated with detection chemistry for use in detecting a given chemical element. Each readout region 502 is also configured to receive a standard solution 504 and generate a color pattern based on the received standard solution. In one embodiment, each column of the calibration card 500 is dedicated to a specific standard solution 504. For example, column 504-1 is dedicated to standard solution S0 and column 504-2 is dedicated to standard solution S1, and so on. In another embodiment, in any given column, each row of the calibration card 500 is dedicated to a different concentration of that column's corresponding standard solution. For example, the first row of column 504-1 corresponding to standard solution S0 represents a concentration of 0.78 mg/L of standard solution S0. The second row of column 504-1 corresponding to standard solution S0 has a concentration of 1.56 mg/L of standard solution S0. Similarly, the first row of column 504-2 can have a first concentration of standard solution S1 and the second row of column 504-2 can have a second concentration of standard solution S1, wherein the second concentration is greater than the first concentration. FIG. 5 illustrates that the standard solutions increase from the first row to the last row (denoted as 506); however, other presentation hierarchies may be implemented in alternative embodiments. It is also not necessary that the different columns are dedicated to the different standard solutions 504. For example, the different rows can be dedicated to the different standard solutions instead. The one or more standard solutions may comprise, by way of example only, different concentrations of aluminum, nitrate, and calcium or different chemical parameters, such as, for example, pH. Column 508 provides reference color points for ambient light compensation and will be explained below in the context of FIG. 9.

Figure 6:
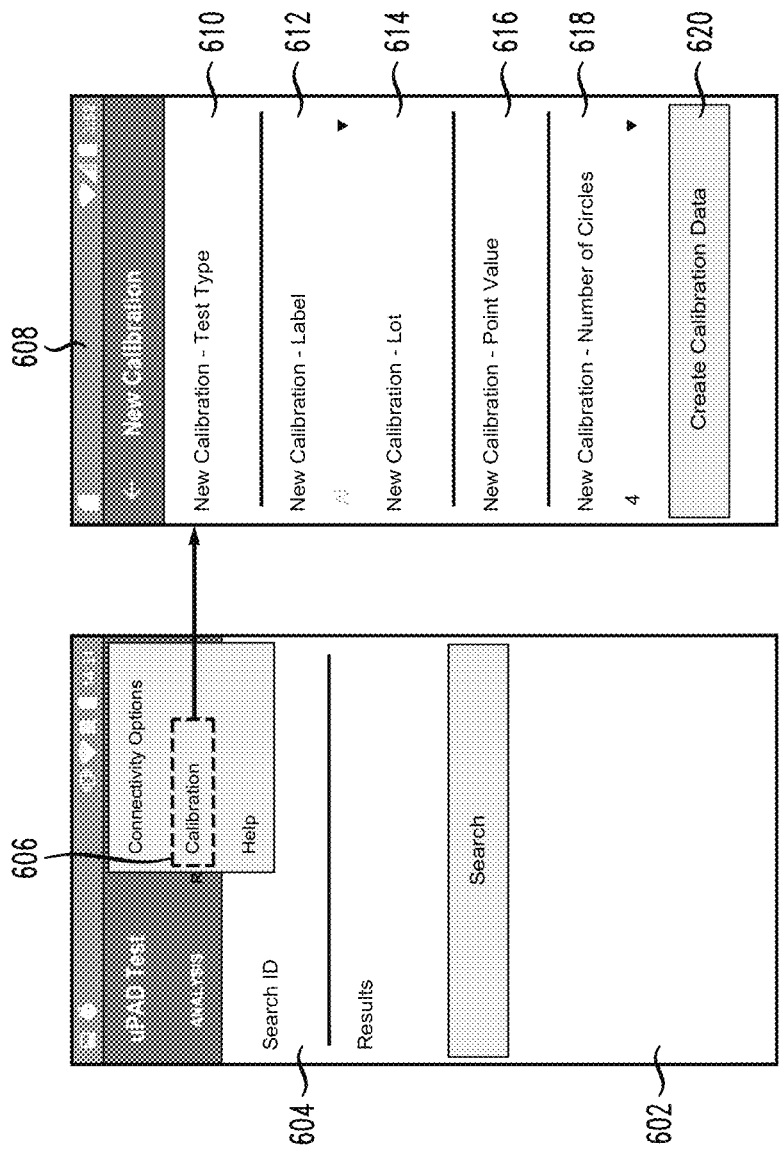
FIG. 6 illustrates a mobile application portion of a calibration procedure, according to an illustrative embodiment.

FIG. 6 illustrates a mobile application portion 600 of a calibration procedure. It is to be understood that the mobile application executes on mobile device 114. The mobile application has a special calibration mode, related to step 408 in FIG. 4, wherein the user decides whether colorimetric calibration data from an image will be created in the mobile application on the mobile device 114 or whether the image will be uploaded to cloud computing environment 106 such that the cloud computing environment will create the colorimetric calibration data. FIG. 6 shows the mobile application portion 600 for which the user decided that the mobile application will create the colorimetric calibration data.

Calibration home screen 602 allows the user to search for an already existing calibration file using the search feature in 604. In one illustrative embodiment, by utilizing the search feature 604, the user can search a calibration file database located in cloud computing environment 106 for a particular calibration file. Such particular calibration file may be searched, for example, based on a manufacturing lot number of an analysis card or the types of tests utilized for the mobile chemical analysis, such as, for example, a pH test. In another illustrative embodiment, the user can select calibration feature 606 to navigate the user to the calibration entry screen 608.

Calibration entry screen 608 comprises test type field 610 (e.g.: pH test), label field 612 (e.g.: pH), manufacturing lot field 614, point value field 616 (e.g.: concentration values), number of circles field 618 (e.g.: number of circles present in the calibration card 112 of FIG. 1), and create calibration data button 620, which takes one or more pictures and executes image processing, generating the calibration data as in step 410 in FIG. 4, sending it and storing data (steps 412 and 414 in FIG. 4) to cloud computing environment 106 of FIG. 1.

Figure 7:
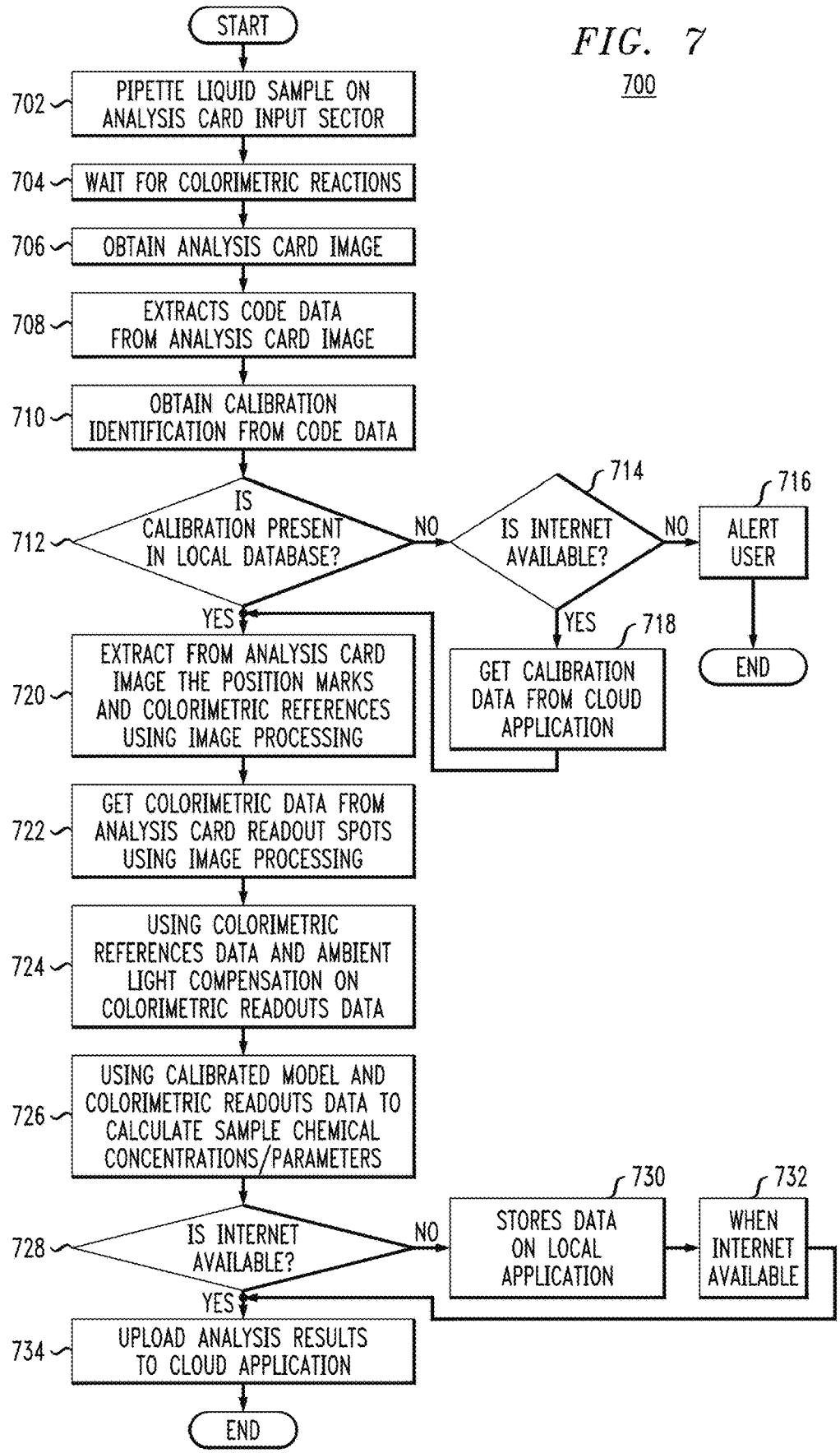
FIG. 7 illustrates a chemical analysis procedure, according to an illustrative embodiment.

FIG. 7 illustrates a chemical analysis procedure 700 (e.g., 104 of FIG. 1), according to an illustrative embodiment. The chemical analysis procedure provides estimation of the unknown chemical attribute of a sample (e.g., chemical element concentration) by processing the resulting color attributes of colorimetric reactions of an analysis card.

At step 702, a target sample is applied to a microfluidic device (117 of FIG. 1) which is part of an analysis card (118 of FIG. 1). The microfluidic device comprises one or more input layers configured to receive the target sample, one or more intermediary layers (e.g., analysis layers), and one or more readout layers configured to present one or more color attributes at one or more readout regions in response to one or more colorimetric reactions to the target sample. At step 702, in one illustrative embodiment, liquid can be pipetted over the target sample such that capillary action present in the microfluidics device permits substances of the sample to reach the intermediate layers and present one or more color attributes at one or more readout regions of the readout layer in response to one or more colorimetric reactions to the target sample.

At step 704, one or more readout regions of the microfluidic device present one or more color attributes to one or more colorimetric reactions to the sample. The one or more color attributes correlate to at least one chemical attribute associated with the target sample, such as, for example, the concentration of the one or more substances of the sample or the pH of the sample. The colorimetric reactions can occur, for example, instantly or take a few minutes, and the reaction time depends on the type of colorimetric analysis performed on the sample. Thus, at step 704, a predefined amount of time is allowed to elapse to guarantee that the colorimetric reaction reached a final and stable state.

At step 706, an image (or multiple images) of the analysis card is obtained. The image can be obtained by an electronic device. Referring back to FIG. 1, the electronic device can be mobile device 114.

At step 708, a code (e.g., 119 of FIG. 1) from the analysis card (e.g., 118 of FIG. 1) is obtained for retrieving a calibration file. The code may comprise a unique identifier for tracking the analysis card. The code may comprise a quick-response (QR) code, bar code or leverage optical character recognition (OCR) techniques to obtain information. A radio frequency identification (RFID) tag chip or equivalent can also be deployed to provide the unique identifier information. The code may also comprise information corresponding to a manufacturing lot of the analysis card or information corresponding to at least one chemical test performable on a sample applied to the analysis card. It is to be understood that mobile device 120, in one or more illustrative embodiments, has a code reader (e.g., QR code application), as in step 710, that captures and interprets the code to get the unique identifier that is used to retrieve the appropriate calibration file from the cloud computing environment 106 or from a local storage on mobile device 114.

At step 712, it is determined if the calibration file corresponding to the analysis card is local to the mobile application. The calibration file of the analysis card comprises calibrated color data (calibrated model) based on at least one known chemical attribute of at least one standard sample. The calibrated model can be, for example, a polynomial equation which correlates the concentration of the standard sample and its respective RGB value.

If it is determined that the calibration file is not local to the mobile application, at step 714, it is determined if a communication network (e.g. Internet) is available, e.g., it is determined whether or not mobile device 114 has Internet access.

If it is determined that the Internet is not available, then, at step 716, an alert (visual and/or sonorous) is issued for the user.

If it is determined that the Internet is available, then, at step 718, the calibration file can be retrieved from a database, such as, a database located in cloud computing environment 106 of FIG. 1. The calibration file can be retrieved from a set of calibration files that corresponds to the code obtained from the analysis card in step 710.

After step 718 or if at step 712 it is determined that the calibration file is local to the mobile application, then at step 720, the mobile device will execute at least one image processing function on the obtained image from step 706 to extract position marks and colorimetric references from the analysis card.

At step 722, at least one more image processing function (more generally, data processing function) is executed by the mobile device on the obtained image to extract colorimetric data corresponding to the color attributes present on each readout region of the analysis card after colorimetric reaction with the target sample. Additional image processing functions are applied at step 724 to compensate for ambient light using the previously extracted colorimetric references.

At step 726, at least one chemical attribute of the target sample is determined applying a data processing function comprising comparing the one or more color attributes at the one or more readout regions in the obtained image of the readout layer to the calibrated models for said color attributes contained in the calibration file. The chemical attribute can be, for example, the concentration of a specific substance of the sample or the pH of the sample.

At step 728, it is determined if a communication network (e.g. Internet) is available, e.g., it is determined whether or not mobile device 114 has Internet access.

If it is determined that the Internet is not available, then, at step 730, the results of step 726 can be stored locally, such as, the memory of mobile device 114, until it is determined that the Internet is available in step 732.

If it is determined that the Internet is available, then, at step 734, the results of step 726 can be uploaded and stored in a database, such as, for example, a database located in cloud computing environment 106.

FIGS. 8A and 8B illustrate components 800 of a chemical analysis card (e.g., 118 of FIG. 1). A chemical analysis card 822 comprises a carton cover 802 and a microfluidic device 812.

Carton cover 802 comprises a front side 804 and a back side 808. The front side 804 comprises an input receptacle 806 configured to receive input layer 814 of microfluidic device 812. The back side 808 comprises a readout receptacle 810 configured to receive readout layer 818 of microfluidic device 812. Carton cover 802 provides support, protection and easier handling for the microfluidic device 812 and information about the chemical analysis performed by the analysis card, such as, for example, tests performable on a target sample. Carton cover 802 may also have additional elements for testing purposes, such as, for example, calibration spots for ambient light compensation, basic instructions, ambient humidity measurement, ambient temperature measurement, power sources, etc. The carton as a cover material is just an example. It should be understood that, for specific purposes and applications, it may be made of other materials, such as plastic for water resistance or combination of one or more materials, such as wax, polymers, etc.

As shown in this illustrative embodiment, microfluidics device 812 comprises an input layer 814, an analysis layer 816, and a readout layer 818. However, in alternative embodiments, the microfluidic device may comprise multiple input layers, multiple analysis layers, and/or multiple readout layers, greatly enhancing the flexibility of the microfluidic device. Input layer 814 is applied to the input receptacle 806 of the carton cover 802. Input layer 814 is configured to receive a sample at an input region. Analysis layer 816 comprises a receiving region, one or more color regions, and one or more chemical reagents extending from the receiving region to the one or more color regions. The different chemical reagents present in the analysis layer determine the type of tests performed on the sample. Different substances of the target sample react with the chemical reagent via capillary action present in the analysis layer 816 of the microfluidic device 812. The readout layer 818 presents the colors produced by the analysis layer 816 at one or more readout regions. The readout layer 818 is applied to a readout receptacle 810 of the carton cover 802. Microfluidic device 812 may also have additional elements to provide additional functionalities, such as, for example, polymers for controlling the flow of the substances of the sample to be chemically analyzed, conductive electrodes for heating the sample, etc.

The chemical analysis card 822 can also comprise a code 820 that can be disposed on the front side 804 or the back side 808 of the carton cover 802. The code 820 may comprise a unique identifier for tracking the analysis card. The code may comprise a quick-response (QR) code, bar code or leverage optical character recognition (OCR) techniques to obtain information. A radio frequency identification (RFID) tag chip or equivalent can also be deployed to provide the unique identifier information. The code 820 may also comprise information corresponding to a manufacturing lot of the analysis card or information corresponding to at least one test performable on a sample applied to the chemical analysis card 822.

The input layer 814, analysis layer 816, and readout layer 818 can be stacked in a configuration such that the analysis layer 816 is operatively disposed between the input layer 814 and the readout layer 818, as depicted in FIG. 8B.

FIG. 9 illustrates further details 900 of a chemical analysis card in FIGS. 8A and 8B. The chemical analysis card may comprise a code 902 or text information, disposed on the front or back side of the chemical analysis card 900. As mentioned, the code 902 may comprise a unique identifier for tracking the analysis card, such as, for example, QR code or leverage OCR for data gathering. The code 902 can be used to track a particular chemical analysis card 900. For example, the tracking of the code 902 may rely on the type of test present in the microfluidics device 904 of the chemical analysis card. The tracking of the code 902 may also rely on other traceable information, such as, for example, a manufacturing lot number of the chemical analysis card, a chemical analysis card unique identifier, or an expiration date of the chemical analysis card.

The chemical analysis card may also comprise external elements to be combined with the microfluidic device 904, such as, for example, batteries for chemical reactions which rely on heating or electrochemistry. The chemical analysis card may also comprise external elements to be combined with the microfluidic device 904, such as, for example, energy harvesting elements.

The chemical analysis card may also comprise detection elements 906 that provide environmental conditions where the test is being performed, such as, for example, ambient temperature and air humidity. The detection elements 906 can be read simultaneously when a code is extracted from an analysis card to determine the optimal calibration file in the database based on the measurements of the detection elements (e.g. pH test calibration for humidity of 70%, etc.).

The chemical analysis card may also comprise fiducial markers 908 that allow image processing functions to orient an image of the readout layer of the microfluidic device 904 and rotate the image accordingly, and perhaps if necessary, for the image processing function to accurately convert the image into color data. The fiducial markers 908 also allow image processing functions to correct the perspective of the image.

Because of variation in different environments, it can be beneficial to account for changes in lighting conditions when executing the chemical analysis. To do this, the chemical analysis card can comprise a color palette 910. The color palette 910 can allow RGB value (or some other color space components) variations due to light variation to be estimated and compensated for in the image processing analysis. For example, after applying a linear least square regression analysis, the color calibration due to light conditions can be calculated using the following formula:

$$C_{calibration} = A * C_{measurement} + B$$

where C is Red, Green or Blue channel, A and B constants.

The chemical analysis card can also provide light condition calibration through the measurement of ambient light of any given readout region that is not subjected to chemical analysis. For example, a given readout region of the microfluidic device can be exempt from performing a chemical test and can instead be used for determining the light conditions that the test was performed under by using the following formula:

$$C_{calibration} = k * C_{measurement}$$

where C is Red, Green or Blue channel, k constant.

The chemical analysis card may also comprise a readout layer output that can be randomized from manufacturing lot to manufacturing lot such that the privacy of the results is assured, being especially important for healthcare applications. In this case, the information on the tests in each position could be encrypted into the code (e.g. QR code).

FIG. 10 illustrates additional details of a microfluidic device (e.g., 117 of FIG. 1) of a chemical analysis card (e.g., 118 of FIG. 1).

As shown, microfluidic device 1004 may be a paper-based microfluidic device, where the microfluidic device 1004 may comprise several layers of paper that rely on paper fiber characteristics for fluid transportation, such as, the wicking effect. In this example, microfluidic device 1004 comprises three layers: input layer 1006, analysis layer 1008, and readout layer 1010. Although FIG. 10 depicts that the microfluidic device 1004 comprises three layers, the microfluidic device may comprise more than three layers. In one embodiment, at a minimum, microfluidic device 1004 has at least one layer for reagent deposition, such as analysis layer 1008. Microfluidic device 1004 can also have at least one layer to receive a target sample, such as input layer 1006. Microfluidic device 1004 can also have at least one layer to provide the colorimetric readout, such as readout layer 1010.

Microfluidic device 1004 executes one or more tests such that the microfluidic device may perform a multi-parameter test. The tests performed depends on the chemical reagents present in the analysis layer 1008 of the microfluidic device 1004.

Microfluidic device 1004 may also comprise conductive and/or metal elements that serve as electrodes. Such electrodes can be used, for example, to produce heat, light and/or electrokinetic phenomena for a chemical reaction. Microfluidic device 1004 may also comprise plastic and/or polymer elements that serve to modify the fluid transportation properties of the microfluidic device 1004.

FIG. 11 illustrates a mobile application portion 1100 of a chemical analysis procedure. Recall that such a mobile application may execute on mobile device 114/120 (FIG. 1).

As shown, analysis screen 1102 of the mobile application portion 1100 provides instructions to a user such that the screen 1102 reminds the user to insert a target sample onto the analysis card and allow the colorimetric reaction to occur. Screen 1102 also reminds the user that the chemical analysis of the sample is performed in two steps: (1) scanning the code of the analysis card or inputting the code of the analysis card, and (2) executing the colorimetric analysis.

Screen 1102 also provides two buttons (selectable features): (1) code scan button 1104, which allows the user to scan the code of an analysis card, and (2) analysis button 1106, which initiates the colorimetric analysis/image processing portion of the analysis methodology, and which can be based on the code (can be used to find the calibration file) and the image of the readout layer of the microfluidic device. It should be noted that the user can also manually enter the code of the analysis card instead of scanning its code. Also, it is important to remember that the code and the image of the readout layer of the microfluidic device can be obtained from a single image acquisition process, in a different embodiment.

If the user selects the code scan button 1104, then the mobile application utilizes the camera technology of the mobile device 1110 executing the mobile application to scan the code of the analysis card.

If the user selects the analysis button 1106, then the mobile application calculates the chemical composition and concentrations of the target sample using one or more image processing functions (more generally, one or more data processing functions). One image processing function can provide for ambient illumination compensation based on the image received by the application. Referring back to FIG. 9, color element 910 can provide for this feature. Still referring to FIG. 9, elements 906 can provide additional information regarding environment conditions such as ambient temperature and/or air humidity, which might be important for certain chemical reactions, using the obtained information with classical chemistry equations, such as Arrhenius equation or using thermodynamics approach, such as Gibbs function. Another image processing function can provide rotation and perspective compensation on the image. Referring back to FIG. 9, fiducial markers 908 can provide for this feature.

The results screen 1108 of the mobile application portion 1100 can also extract and display data features from the mobile device. It is useful for quick visualization of the colorimetric results, before sending the analysis data to the cloud application. For example, the results screen 1108 provides the results of the chemical analysis as well as several other important parameters, such as a geographical location of the chemically analyzed sample, a timestamp of when the chemical analysis was performed on the sample, or the user who performed the chemical analysis. Such parameters can be sent to a cloud application (on cloud computing environment 106) for later data processing and analysis.

Figure 12:
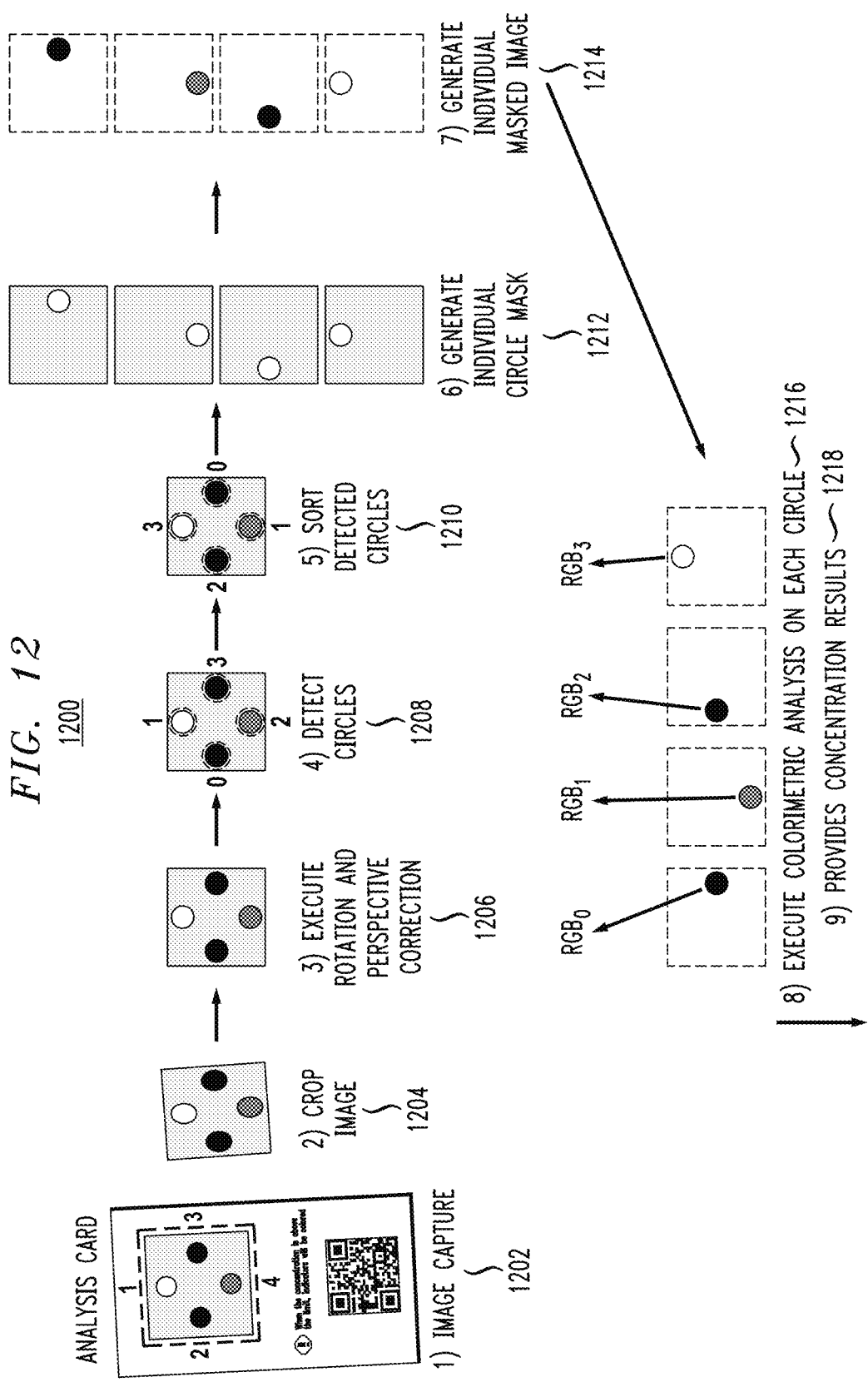
FIG. 12 illustrates an image processing portion of a mobile application, according to an illustrative embodiment.

FIG. 12 illustrates an image processing portion 1200 of a mobile application.

At step 1202, an image of the readout layer of a microfluidic device is obtained. The image can be obtained using an electronic device, such as a mobile phone or tablet. A mobile application can prompt a user to obtain an image of the readout layer of the microfluidic device.

At step 1204, the obtained image of the readout layer can be cropped such that any extra space in the image surrounding the readout layer can be removed so that the extra space is not image processed. The advantage of this approach is eliminating unnecessary structures that might be present in the image, which might generate false readout region detection and also lowers the number of pixels to be processed, providing faster image processing.

At step 1206, rotation and perspective correction can be executed on the image such that the image is properly oriented. Proper orientation can occur when the image is properly rotated such that each image is processed consistently and the correct image processing function is applied in the correct readout region (see 210 of FIG. 2).

At step 1208, each readout region of the readout layer of the image can be detected. One or more detected readout regions can be assigned a unique identifier.

At step 1210, each detected readout region from step 1208 can be sorted.

At step 1212, an individual mask can be generated for each sorted readout region from step 1210. For example, if there are four sorted readout regions, then the image processing function can generate four individual masks, one for each sorted readout region. Although this example depicts a microfluidic device having four readout regions, the process is consistent with a microfluidic device having more or less than four readout regions.

At step 1214, an individual masked image can be generated for each individual mask from step 1212. For example, if there are four individual masks, then the image processing function utilizes those individual masks to generate four individual masked images of each readout region. Although this example deals with a microfluidic device having four readout regions, the process is consistent with a microfluidic device having more or less than four readout regions.

At step 1216, colorimetric analysis is executed on each of the individual masked images from step 1214. When the colorimetric analysis is performed, the image processing function can convert the color of each of the individual masked images into a corresponding RGB value or any other suitable color channel representation, such as HSV, HLS, etc.

At step 1218, a chemical attribute result is provided based on the colorimetric analysis executed on the individual masked images from step 1216. It is known to one ordinarily skilled in the art that a chemical attribute can be, for example, the concentration of a substance of the target sample. At step 1218, the image processing function can provide a concentration result of a particular substance of the target sample based on the colorimetric analysis performed at step 1216.

One possible colorimetric analysis method uses the CIE1931 method, which converts an sRGB value (standard RGB value) to another color space, such as the XYZ color space. The CIE1931 method uses the following steps:

1) Convert from sRGB to linear RGB, by using:

$$C_{linear} = \left(\frac{C_{sRGB} + 0.055}{1.055}\right)^{2.4}$$

where C is Red, Green or Blue channel.
2) Convert linear RGB to XYZ space using:

$$\begin{bmatrix} X \\ Y \\ Z \end{bmatrix} = \begin{bmatrix} 0.4124 & 0.3576 & 0.1805 \\ 0.2136 & 0.7152 & 0.0722 \\ 0.0193 & 0.1192 & 0.9505 \end{bmatrix} \begin{bmatrix} R_{linear} \\ G_{linear} \\ B_{linear} \end{bmatrix}$$

3) Chromaticity values x and y are obtained with:

$$x = \frac{X}{X+Y+Z} \text{ and } y = \frac{Y}{X+Y+Z}$$

The colorimetric analysis can also be obtained using statistical data analysis and machine learning. For example, measured data can be used to calibrate a regression model where the output is discrete, such as a logistic regression. Using such a regression model allows the probability of input (e.g., sRGB channel values) belonging to a certain category or bin to be calculated. Such a regression model can be calculated using the following formula:

$$P^{ci}(X) = \frac{e^{a_i + b_i}}{1 + e^{a_i + b_i}}$$

Intervals can be defined by determining concentration or diagnostics values and also has a dependency of how accurate is the color change due to chemical reaction in 117 of FIG. 1.

Machine learning algorithms, such as multilayer perceptron, can be also used for colorimetric analysis.

Figure 13:
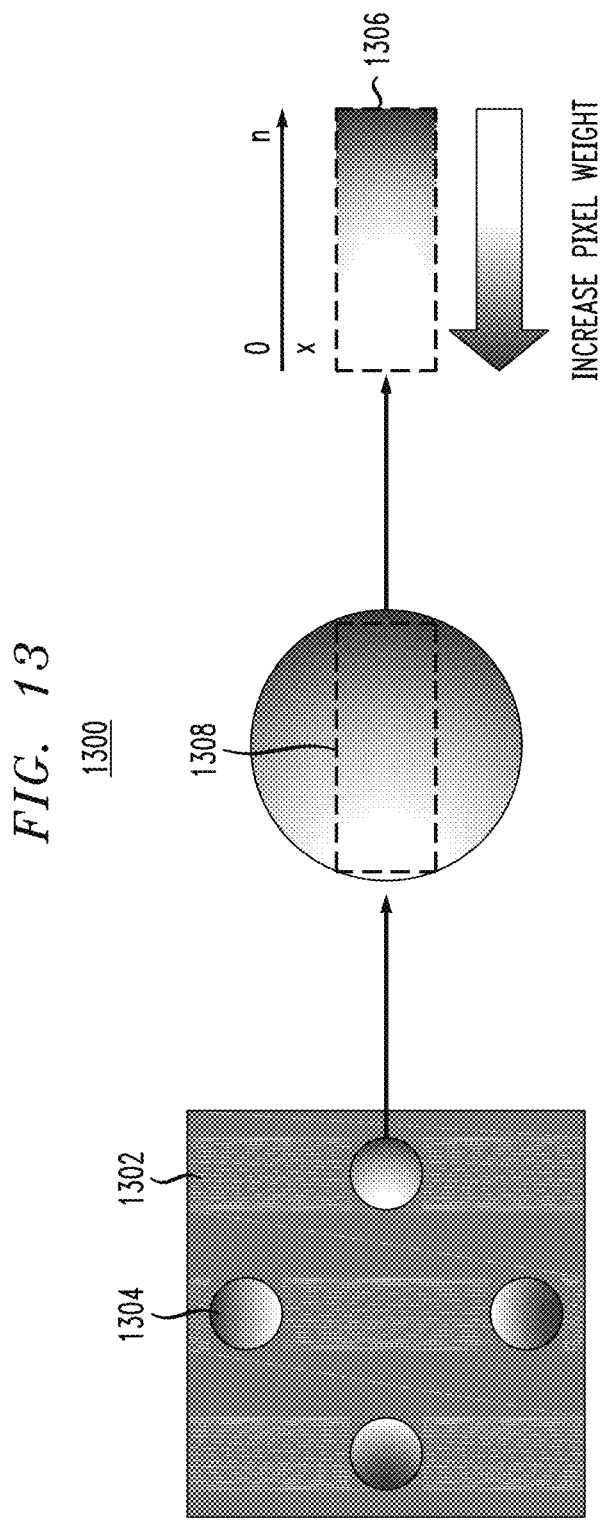
FIG. 13 illustrates a colorimetric analysis portion of a mobile application, according to an illustrative embodiment.

FIG. 13 illustrates another colorimetric analysis embodiment 1300 of a mobile application.

After a colorimetric reaction has occurred in a readout region 1304 of a microfluidics device 1302, there is a possibility that a color gradient can reside in a readout region 1304, which can occur based on an inherent characteristic of the chemical reaction, which can be a result of color titration reaction in the paper. A color gradient 1306 can occur in a readout region whereby one side of the readout region is a different color than a different side of the same readout region.

Referring back to FIG. 12, after detection and sorting at steps 1208 and 1210, respectively, image processing functions can execute additional functions to take a color gradient into account. For example, after detecting a color gradient, an additional image processing function can crop an image of specific readout region such that the cropped image 1308 represents the color gradient. Another possibility is generating in 1212 a rectangle mask over the detected circles. One way to account for color gradient can be by applying pixel weight over the rectangle length to obtain an estimated concentration value using the following formula:

$$\text{Value} = \sum_{1}^{n} \frac{(n-x) * C_{value}}{n}$$

where C is Red, Green or Blue channel.

Figure 14:
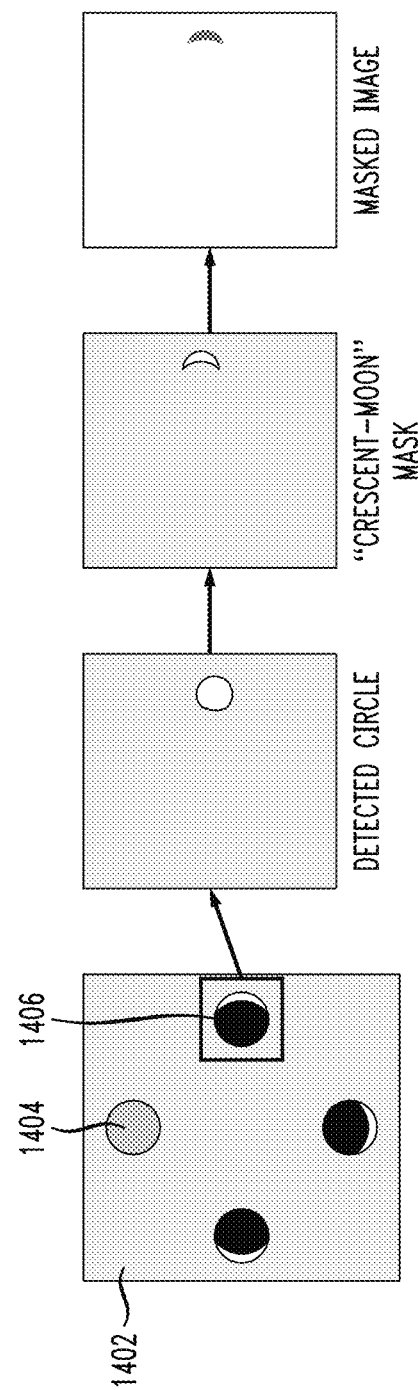
FIG. 14 illustrates further details of a colorimetric analysis portion of a mobile application, according to an illustrative embodiment.

FIG. 14 illustrates further details of a colorimetric analysis portion 1400 of a mobile application.

After a colorimetric reaction has occurred in a given readout region 1404 of a microfluidics device 1402, there is a possibility that a crescent moon color pattern can reside in a readout region 1406, which can occur because of the non-uniform distribution of the color throughout a given readout region 1404. When such a crescent moon color pattern exists, such as in readout region 1406, the colorimetric analysis can be executed on only the outer part of a readout region 1406 such that an attribute of a sample is determined based on the image processing of the color of the outer part of the readout region 1406. Also, microfluidic device 812 may include special readout layers made to remove, increase or decrease this color distribution (half moon shape) depending on the application, which means that the geometry of the readout layer can be modified to generate different color distributions, which may be suitable for specific purposes or to increase accuracy of the image processing.

To accomplish analyzing only the outer portion of readout region 1406, an image processing function can detect the readout region 1406 and determine that a crescent moon color pattern exists in the readout region 1406. Referring back to FIG. 12, the readout region can be detected in a similar manner to step 1208. After a readout region has been detected, such as readout region 1406, a crescent moon mask can be generated for the readout region. Referring back to FIG. 12, the readout region can be detected in a similar manner to step 1212. After the crescent moon mask has been generated, an individual masked image can be generated for the readout region 1406. Referring back to FIG. 12, the readout region can be detected in a similar manner to step 1214. After the individual masked image of the readout region 1406 is generated, the mobile application can perform the rest of the chemical analysis as per illustrative embodiments described herein.

By performing the colorimetric analysis portion 1400, more consistent results can be obtained as can be compared to the results when the entire readout region undergoes image processing even though a given readout region might have non-uniform conditions.

Figure 15:
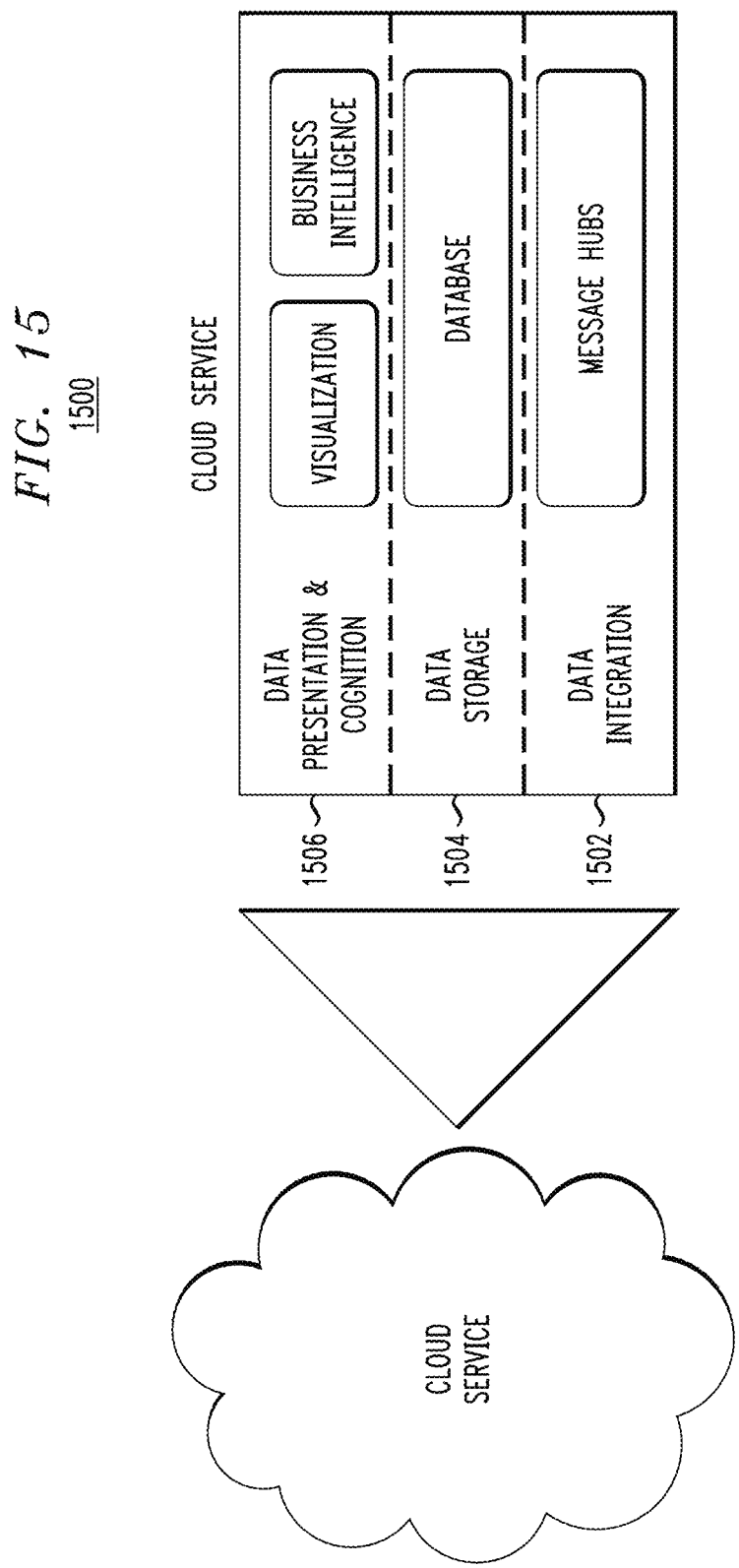
FIG. 15 illustrates a cloud application portion of a chemical analysis procedure, according to an illustrative embodiment.

FIG. 15 illustrates a cloud application portion 1500 of a chemical analysis methodology.

Cloud application 1500 allows clients, such as, for example, web browsers, mobile applications, servers, etc., to consume the data of the cloud application 1500, which facilitates ubiquitous and pervasive access to the data. The cloud application portion 1500 may comprise a data integration portion 1502, a data storage portion 1504, and a data presentation and cognition portion 1506. Cloud application portion 1500 can be configured to gather, store, visualize, and analyze data. Cloud application 1500 can be built as a Platform-as-a-Service (PaaS) cloud service, which gives it flexibility in terms of scalability and features.

Data integration portion 1502 performs the reception and transmission of data packets to the electronic devices (e.g., mobile devices 114 and 120) belonging to the cloud application 1500. The data packets can be represented by, for example, text messages, images, or other events. Data integration portion 1502 can gather data by, for example, light-weight protocols suitable for Internet of Things (IoT) applications or HTTP/HTTPS protocols, by using a standardized Application Programming Interface (API). Data integration portion 1502 can be implemented using the IBM Watson IoT Platform cloud service from IBM Bluemix cloud PaaS, which uses telemetry messaging protocols such as Message Queueing Telemetry Transport (MQTT).

Data storage portion 1504 can store the data in memory of the cloud computing environment (e.g., 106 of FIG. 1). The memory can be stored in, for example, a distributed non-relational database for multiplication scenarios. Data persistence is provided by data storage portion 1504. Data storage portion 1504 can be implemented using cloud services that store and organize structured data (SQL) or unstructured data (NoSQL). Examples of such cloud services include, but are not limited to, IBM DB2, Cloudant, and MongoDB.

Data presentation and cognition portion 1506 can provide visualization in a web interface (e.g., 108 of FIG. 1). The visualized data can be leveraged, for example, to gather the data or to generate reports based on the data. Possible functions of the data presentation and cognition portion 1506 can be to visualize data gathering by web application, mobile application update service, data queries, statistical and/or visual trends of data interpretations, and automatic cognitive insights.

Figure 16:
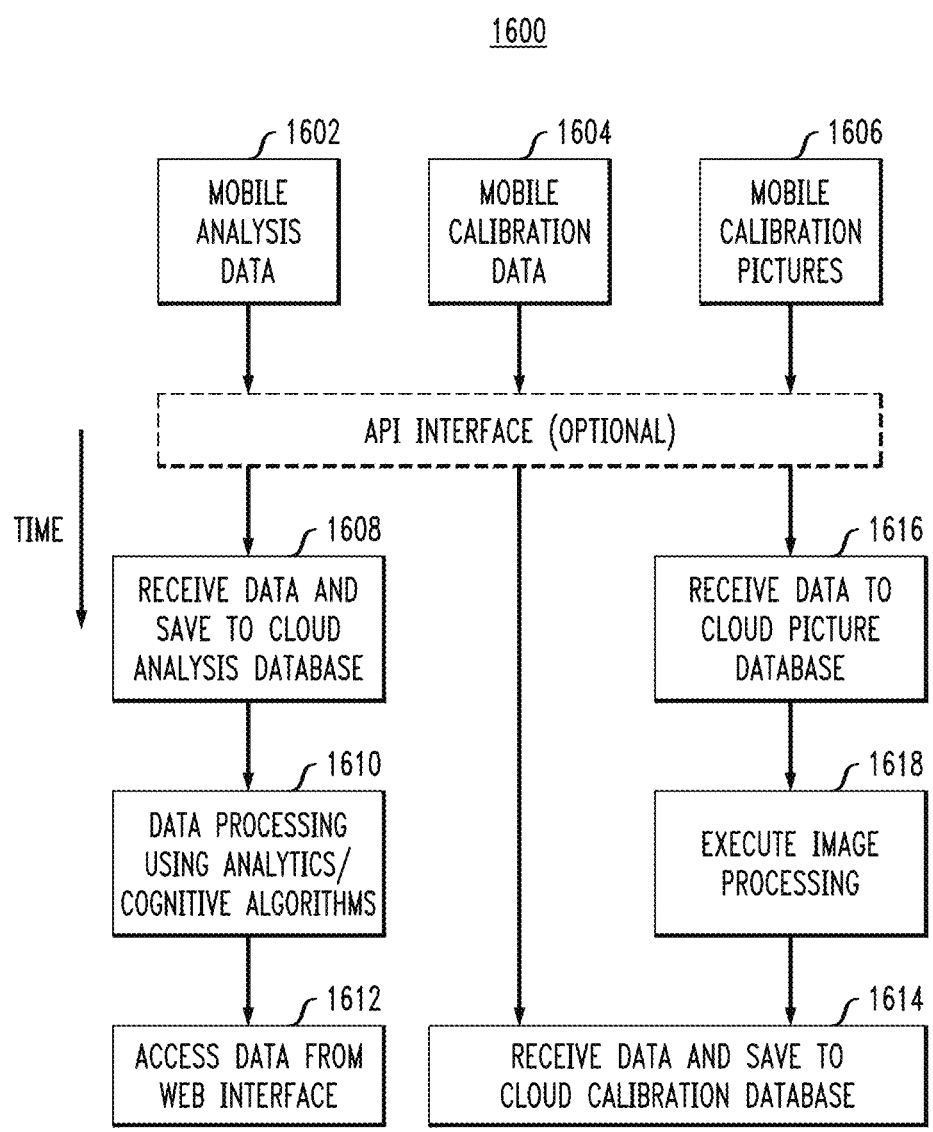
FIG. 16 illustrates further details of a cloud application portion of a chemical analysis procedure, according to an illustrative embodiment.

FIG. 16 illustrates further details of a cloud platform 1600 of a chemical analysis methodology. Cloud platform 1600 can be used to store analysis data from all the analysis executed in the field. The different types of data that can be inputted into the cloud platform 1600 comprise mobile analysis data 1602, mobile calibration data 1604, and mobile calibration pictures 1606. Mobile analysis data 1602 can comprise the results of the chemical analysis after an electronic device executed image processing functions on an image of a readout layer of a microfluidic device after a colorimetric reaction. Mobile calibration data 1604 can comprise colorimetric calibration data based on an electronic device executing image processing functions on an image of a calibration card. Mobile calibration pictures 1606 can comprise images of calibration cards that have not been image processed.

After mobile analysis data 1602 is received by the cloud platform 1600, the data 1602 can be saved to a cloud analysis database at 1608, processed using analytics/cognitive/machine learning algorithms at 1610, and accessed from a web interface at 1612. The data 1602 can be further processed at 1610 to provide useful insights about the data 1602 such that the useful insights can be shown to a user of the web interface.

After mobile calibration data 1604 is received by the cloud platform 1600, the data 1604 can be saved to a cloud calibration database at 1614.

After the mobile calibration pictures 1606 are received to a cloud picture database at 1616, the pictures can be image processed to produce colorimetric calibration data at 1618, and the colorimetric calibration data can be sent to the cloud calibration database at 1614.

Figure 17:
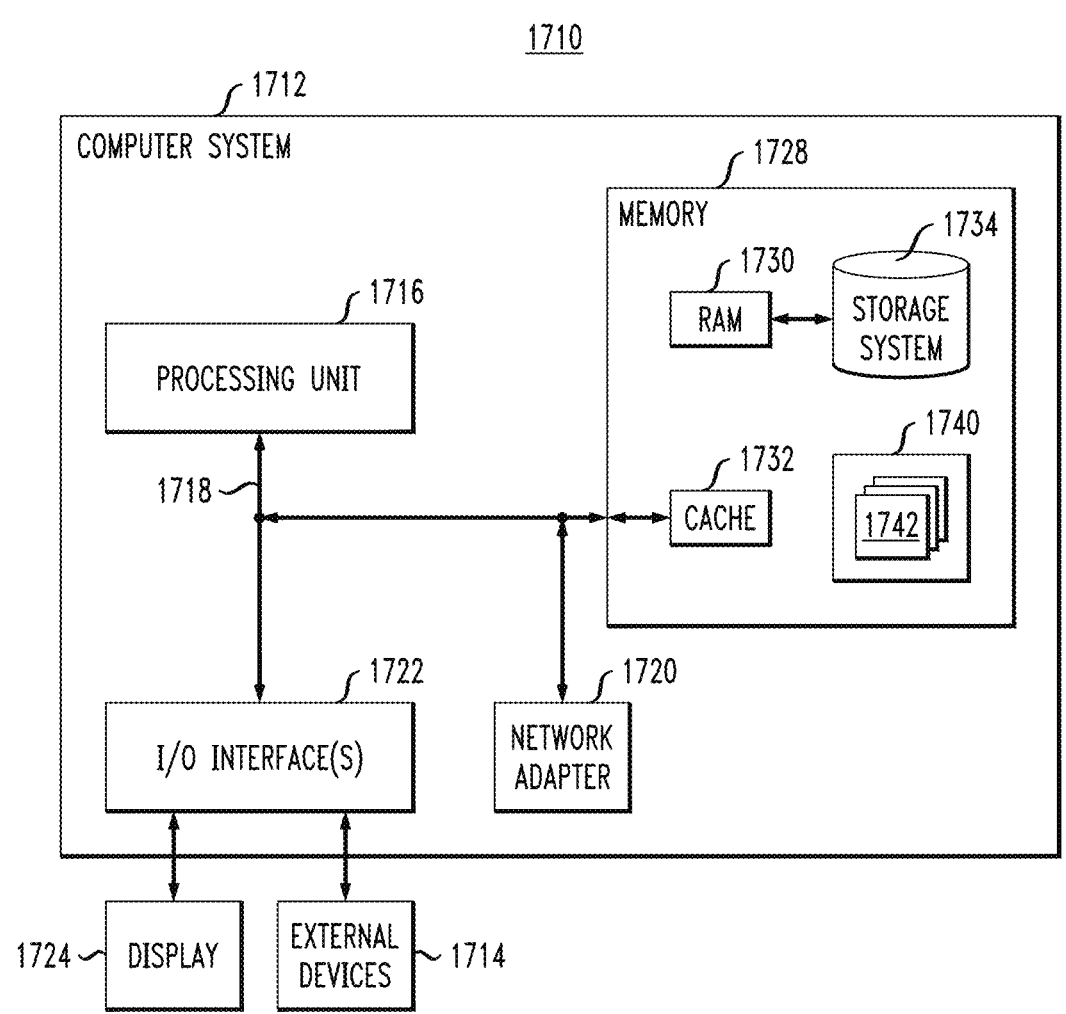
FIG. 17 illustrates a computer system in accordance with which one or more components/steps of techniques of the invention may be implemented, according to an illustrative embodiment.

One or more embodiments can make use of software running on a computer or workstation. With reference to FIG. 17, in a computing node 1710 there is a system/server 1712, which is operational with numerous other general purpose or special purpose computing system environments or configurations. Examples of well-known computing systems, environments, and/or configurations that may be suitable for use with system/server 1712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each computing node in the computing platform 1700 can implement the architecture shown in computing node 1710.

System/server 1712 may be described in the general context of computer system executable instructions, such as program modules, being executed by a computer system. Generally, program modules may include routines, programs, objects, components, logic, data structures, and so on that perform particular tasks or implement particular abstract data types. System/server 1712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 17, system/server 1712 is shown in the form of a computing device. The components of system/server 1712 may include, but are not limited to, one or more processors or processing units 1716, system memory 1728, and bus 1718 that couples various system components including system memory 1728 to processor 1716.

Bus 1718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

System/server 1712 typically includes a variety of computer system readable media. Such media may be any available media that is accessible by system/server 1712, and it includes both volatile and non-volatile media, removable and non-removable media.

The system memory 1728 can include computer system readable media in the form of volatile memory, such as random access memory (RAM) 1730 and/or cache memory 1732. System/server 1712 may further include other removable/non-removable, volatile/nonvolatile computer system storage media. By way of example only, storage system 1734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1718 by one or more data media interfaces.

As depicted and described herein, memory 1728 may include at least one program product having a set (e.g., at least one) of program modules that are configured to carry out the functions of embodiments of the invention. A program/utility 1740, having a set (at least one) of program modules 1742, may be stored in memory 1728 by way of example, and not limitation, as well as an operating system, one or more application programs, other program modules, and program data. Each of the operating system, one or more application programs, other program modules, and program data or some combination thereof, may include an implementation of a networking environment. Program modules 1742 generally carry out the functions and/or methodologies of embodiments of the invention as described herein.

System/server 1712 may also communicate with one or more external devices 1714 such as a keyboard, a pointing device, an external data storage device (e.g., a USB drive), display 1724, one or more devices that enable a user to interact with system/server 1712, and/or any devices (e.g., network card, modem, etc.) that enable system/server 1712 to communicate with one or more other computing devices. Such communication can occur via I/O interfaces 1722. Still yet, system/server 1712 can communicate with one or more networks such as a LAN, a general WAN, and/or a public network (e.g., the Internet) via network adapter 1720. As depicted, network adapter 1720 communicates with the other components of system/server 1712 via bus 1718. It should be understood that although not shown, other hardware and/or software components could be used in conjunction with system/server 1712. Examples include, but are not limited to, microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 18:
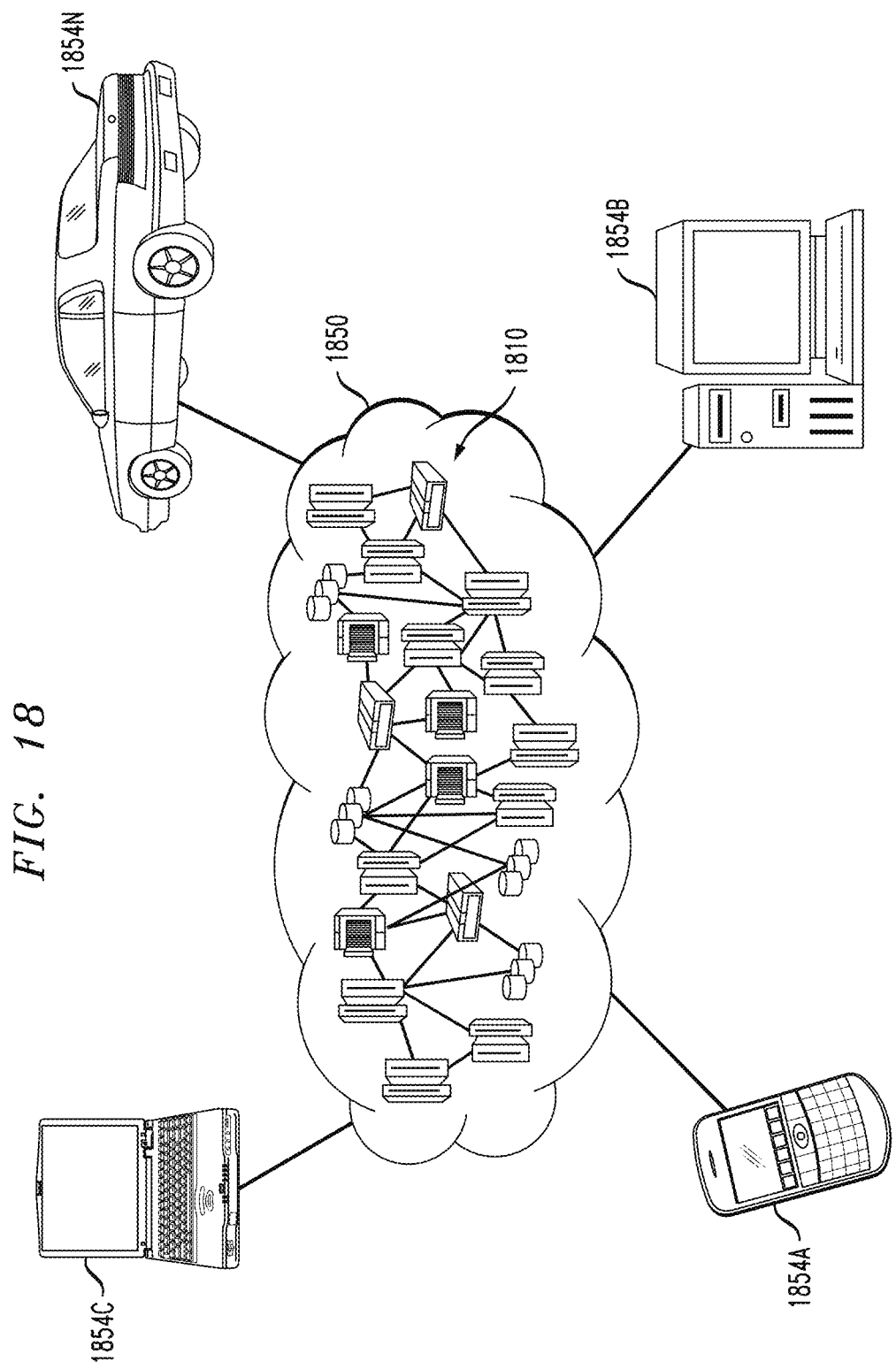
FIG. 18 illustrates a cloud computing environment, according to an illustrative embodiment.

Referring now to FIG. 18, illustrative cloud computing environment 1850 is depicted. As shown, cloud computing environment 1850 includes one or more cloud computing nodes 1810 with which local computing devices used by cloud consumers, such as, for example, personal digital assistant (PDA) or cellular telephone 1854A, desktop computer 1854B, laptop computer 1854C, and/or automobile computer system 1854N may communicate. Nodes 1810 may communicate with one another. They may be grouped (not shown) physically or virtually, in one or more networks, such as Private, Community, Public, or Hybrid clouds as described hereinabove, or a combination thereof. This allows cloud computing environment 1850 to offer infrastructure, platforms and/or software as services for which a cloud consumer does not need to maintain resources on a local computing device. It is understood that the types of computing devices 1854A-N shown in FIG. 18 are intended to be illustrative only and that computing nodes 1810 and cloud computing environment 1850 can communicate with any type of computerized device over any type of network and/or network addressable connection (e.g., using a web browser).

Figure 19:
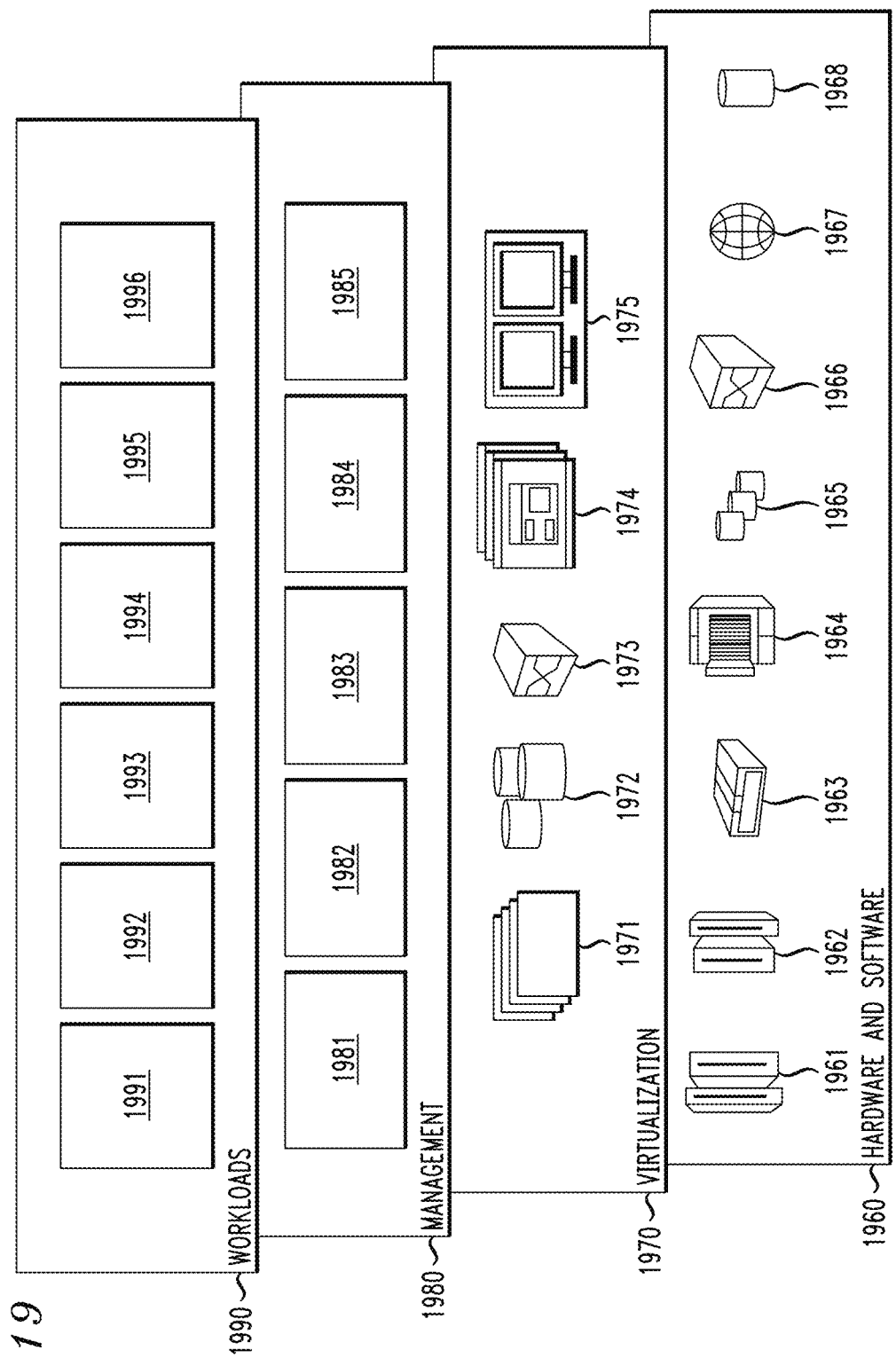
FIG. 19 illustrates abstraction model layers, according to an illustrative embodiment.

Referring now to FIG. 19, a set of functional abstraction layers provided by cloud computing environment 1850 (FIG. 18) is shown. It should be understood in advance that the components, layers, and functions shown in FIG. 19 are intended to be illustrative only and embodiments of the invention are not limited thereto. As depicted, the following layers and corresponding functions are provided:

Hardware and software layer 1960 includes hardware and software components. Examples of hardware components include: mainframes 1961; RISC (Reduced Instruction Set Computer) architecture based servers 1962; servers 1963; blade servers 1964; storage devices 1965; and networks and networking components 1966. In some embodiments, software components include network application server software 1967 and database software 1968.

Virtualization layer 1970 provides an abstraction layer from which the following examples of virtual entities may be provided: virtual servers 1971; virtual storage 1972; virtual networks 1973, including virtual private networks; virtual applications and operating systems 1974; and virtual clients 1975.

In one example, management layer 1980 may provide the functions described below. Resource provisioning 1981 provides dynamic procurement of computing resources and other resources that are utilized to perform tasks within the cloud computing environment. Metering and Pricing 1982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1983 provides access to the cloud computing environment for consumers and system administrators. Service level management 1984 provides cloud computing resource allocation and management such that required service levels are met. Service Level Agreement (SLA) planning and fulfillment 1985 provide pre-arrangement for, and procurement of, cloud computing resources for which a future requirement is anticipated in accordance with an SLA.

Workloads layer 1990 provides examples of functionality for which the cloud computing environment may be utilized.

Examples of workloads and functions which may be provided from this layer include: data measurement 1991; data transmission 1992; data analytics processing 1993; model calculation 1994; model generalization 1995; and injection automation 1996, which may perform various functions described above.

Embodiments of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems

What is claimed is:

1. A method comprising:
receiving a target sample to be chemically analyzed at a microfluidic device which is part of an analysis card, wherein the microfluidic device comprises at least one input layer configured to receive the target sample, at least one intermediary layer, and at least one readout layer configured to present one or more color attributes at one or more readout regions in response to one or more colorimetric reactions to the target sample;
obtaining one or more images of the readout layer of the microfluidic device;
obtaining a calibration file that corresponds to the analysis card, wherein the calibration file comprises at least one calibrated model of one or more color attributes based on data from at least one known chemical attribute of at least one standard sample processed by a calibration card; and
determining at least one chemical attribute of the target sample utilizing at least one data processing function on the obtained image, wherein the data processing function comprises comparing the one or more color attributes at the one or more readout regions in the obtained image of the readout layer to the calibrated model of one or more color attributes of the obtained calibration file based on the data from at least one known chemical attribute of at least one standard sample processed by the calibration card;
wherein obtaining the calibration file that corresponds to the analysis card further comprises:
obtaining a code from the analysis card; and
retrieving the calibration file from a set of calibration files that corresponds to the code obtained from the analysis card; and
wherein one or more steps of the method are performed by at least one processing device.

2. The method of claim 1, wherein the code comprises a unique identifier for tracking the analysis card.

3. The method of claim 1, wherein the code comprises a quick-response code, bar code, radio frequency identification chip content or plain text.

4. The method of claim 1, wherein the code comprises information corresponding to a manufacturing lot of the analysis card.

5. The method of claim 1, wherein the code comprises information corresponding to at least one type of test performable on a sample applied to the analysis card.

6. The method of claim 1, further comprising adding information comprising temporal, geographical or user data.

7. The method of claim 1, wherein the calibration file is generated prior to chemical analysis of the target sample using a calibration procedure.

8. The method of claim 7, wherein the calibration procedure comprises:
applying at least one standard sample to a calibration card, wherein the calibration card comprises one or more readout regions that present one or more color attributes in response to one or more colorimetric reactions to the standard sample, and wherein the one or more color attributes correlate to at least one chemical attribute associated with the at least one standard sample;
creating the at least one calibrated model of the one or more color attributes of the readout regions in the calibration card for the standard sample; and
storing the at least one calibrated model of the one or more color attributes as data in a calibration file for retrieval during chemical analysis of the target sample.

9. The method of claim 8, wherein the calibration card comprises a circle matrix wherein each circle in the circle matrix is pre-treated with detection chemistry for use in detecting a given chemical element.

10. The method of claim 9, wherein two or more circles in the circle matrix are configured to detect two or more attributes of the same chemical element.

11. The method of claim 8, wherein the at least one calibrated model comprises a machine learning algorithm.

12. The method of claim 1, wherein the at least one data processing function is executed on a mobile device.

13. The method of claim 12, wherein the mobile device that executes the at least one data processing function also performs the step of obtaining the image of the readout layer of the microfluidic device.

14. The method of claim 1, wherein the at least one data processing function is executed on a computing platform remote from the microfluidic device.

15. The method of claim 14, wherein the computing platform comprises a cloud computing platform.

16. The method of claim 1, wherein determining the at least one chemical attribute of the target sample utilizing the at least one data processing function on the image of the readout layer of the microfluidics device further comprises:
generating at least one location mask based on a given readout region and a size of the given readout region;
generating at least one masked image based on the at least one location mask and the size of the given readout region; and
determining at least one color space value based on the at least one masked image.

17. The method of claim 1, wherein the intermediary layer of the microfluidic device further comprises one or more analysis layers operatively disposed between the input layer and the readout layer.

18. The method of claim 17, wherein the analysis layer is configured to provide one or more colorimetric analyses on the target sample received at the input layer such that the one or more color attributes are presented at the readout layer in response to the colorimetric reaction.

19. The method of claim 16, wherein the data processing function determines color gradient or spatial color distribution properties.

20. The method of claim 6, wherein the calibration file selection depends on a sensor reading on the analysis card.

21. An article of manufacture comprising a non-transitory processor-readable storage medium having stored therein program code of one or more software programs, wherein the program code when executed by the processing device causes the processing device to perform the steps of claim 1.

22. A system comprising:
one or more processing devices, wherein each processing device comprises a memory and a processor operatively coupled to the memory, and wherein the one or more processing devices are configured to:
obtain an image of a readout layer of a microfluidic device, wherein the microfluidic device is part of an analysis card and comprises at least one input layer configured to receive a target sample to be chemically analyzed, at least one intermediary layer, and at least one readout layer configured to present one or more color attributes at one or more readout regions in response to one or more colorimetric reactions to the target sample;

obtain a calibration file that corresponds to the analysis card, wherein the calibration file comprises at least one calibrated model of one or more color attributes based on data from at least one known chemical attribute of at least one standard sample processed by a calibration card; and determine at least one chemical attribute of the target sample utilizing at least one data processing function on the obtained image, wherein the data processing function comprises comparing the one or more color attributes at the one or more readout regions in the obtained image of the readout layer to the calibrated model of one or more color attributes of the obtained calibration file based on the data from at least one known chemical attribute of at least one standard sample processed by the calibration card;

wherein the one or more processing devices are further configured to obtain the calibration file that corresponds to the analysis by obtaining a code from the analysis card and retrieving the calibration file from a set of calibration files that corresponds to the code obtained from the analysis card.

23. The system of claim 22, wherein the one or more processing devices comprise a mobile device and the at least one data processing function is executed on the mobile device.

24. The system of claim 23, wherein the mobile device that executes the at least one data processing function also performs the step of obtaining the image of the readout layer of the microfluidic device.

25. The system of claim 22, wherein the one or more processing devices comprise a computing platform remote from the microfluidic device and the at least one data processing function is executed on the computing platform.

26. The system of claim 22, wherein the analysis card comprises at least one color palette, and one or more alignment marks.

27. The system of claim 22, wherein the analysis card comprises at least one temperature sensor and at least one humidity sensor or other environmental sensors.

28. An apparatus comprising:
a microfluidic device comprising:
at least one input layer configured to receive a target sample to be chemically analyzed;
at least one readout layer configured to present one or more color attributes at one or more readout regions in response to one or more colorimetric reactions to the target sample;
one or more analysis layers operatively disposed between the input layer and the readout layer, and configured to provide one or more colorimetric analysis on the target sample received at the input layer such that the one or more color attributes are presented at the readout layer in response to the colorimetric reactions; and
a code configured to uniquely identify a calibration file for retrieval, wherein the calibration file corresponds to one or more capabilities of the microfluidic device and comprises at least one calibrated model of one or more color attributes based on data from at least one known chemical attribute of at least one standard sample processed by a calibration card, to enable determining at least one chemical attribute of the target sample utilizing eat least one data processing function that comprises comparing the one or more color attributes at the one or more readout regions of the readout layer to the calibrated model of the one or more color attributes of the obtained calibration file based on the data from at least one known chemical attribute of at least one standard sample processed by the calibration card.

29. The apparatus of claim 28, comprising a mobile device and the at least one data processing function is executed on the mobile device.

30. The apparatus of claim 29, wherein the mobile device that executes the at least one data processing function also obtains an image of the readout layer of the microfluidic device.

* * * * *